(12) United States Patent
Higuchi et al.

(10) Patent No.: US 12,315,221 B2
(45) Date of Patent: May 27, 2025

(54) CONTROL METHOD AND INFORMATION PROCESSING APPARATUS

(71) Applicant: FUJITSU LIMITED, Kawasaki (JP)

(72) Inventors: Yuji Higuchi, Kawasaki (JP); Toshiya Shimizu, Kawasaki (JP); Ikuya Morikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 358 days.

(21) Appl. No.: 17/830,171

(22) Filed: Jun. 1, 2022

(65) Prior Publication Data

US 2022/0301288 A1     Sep. 22, 2022

Related U.S. Application Data

(63) Continuation of application No. PCT/JP2020/001409, filed on Jan. 17, 2020.

(51) Int. Cl.
*G06V 10/764* (2022.01)
*G06N 3/04* (2023.01)
*G06V 10/77* (2022.01)
*G06V 10/776* (2022.01)
*G06V 10/82* (2022.01)

(52) U.S. Cl.
CPC ........ *G06V 10/764* (2022.01); *G06V 10/7715* (2022.01); *G06V 10/776* (2022.01); *G06V 10/82* (2022.01); *G06N 3/04* (2013.01)

(58) Field of Classification Search
CPC ............. G06V 10/764; G06V 10/7715; G06V 10/776; G06V 10/82; G06V 10/7747;
(Continued)

(56) References Cited

U.S. PATENT DOCUMENTS 11,410,033 B2 *  8/2022  Neves ................. G06V 10/454
2018/0115568 A1   4/2018  Du
(Continued)

FOREIGN PATENT DOCUMENTS

JP     2018-067304 A     4/2018

OTHER PUBLICATIONS

Extended European Search Report dated Dec. 13, 2022 for corresponding European Application No. 20913100.2, 9 pages.
(Continued)

*Primary Examiner* — Stephen R Koziol
*Assistant Examiner* — Michael Kim Maiden
(74) *Attorney, Agent, or Firm* — Fujitsu Intellectual Property Center

(57) ABSTRACT

A storage unit holds a classification model that calculates a confidence score from image data, and a transformation model that is a model for transforming a feature value having fewer dimensions than the image data into the image data and is created such that a set of feature values corresponding to a set of image data follows a probability distribution. A processing unit extracts a feature value according to the probability distribution. The processing unit transforms the feature value into image data using the transformation model and calculates a confidence score corresponding to the image data using the classification model. The processing unit updates, based on the probability distribution and the feature value, a feature value to be input to the transformation model from the feature value to a feature value in such a manner that a confidence score to be calculated is higher than the confidence score.

6 Claims, 16 Drawing Sheets

(58) Field of Classification Search
CPC .......... G06V 40/16; G06N 3/04; G06N 3/045; G06N 3/047; G06N 3/084; G06F 21/57
See application file for complete search history.

(56) References Cited

U.S. PATENT DOCUMENTS

| | | | | |
|---|---|---|---|---|
| 2018/0329418 | A1* | 11/2018 | Baalke | G16Z 99/00 |
| 2020/0090345 | A1* | 3/2020 | Krebs | A61B 5/7267 |
| 2020/0151521 | A1* | 5/2020 | Almazán | G06F 18/2431 |

OTHER PUBLICATIONS

Samyadeep Basu et al., "Membership Model Inversion Attacks for Deep Networks", arXiv:1910.04257v1 [cs.LG], Oct. 9, 2019, pp. 1-7 (Total 7 pages).

Ajil Jalal et al., "The Robust Manifold Defense: Adversarial Training using Generative Models", arXiv:1712.09196v5 [cs.CV], Jul. 10, 2019, pp. 1-19 (Total 19 pages).

International Search Report and Written Opinion of the International Searching Authority (Form PCT/ISA/210 and 237), mailed in connection with PCT/JP2020/001409 and mailed Feb. 18, 2020 (Total 6 pages).

Japanese Office Action mailed May 23, 2023 for corresponding Japanese Patent Application No. 2021-570588, with English Translation, pp. 4.

EPOA—European Patent Office Action dated Nov. 11, 2024 for corresponding European Application No. 20913100.2 [5 pages].

Trung Ha et al., "Differential Privacy in Deep Learning: An Overview", 2019 International Conference on Advanced Computing and Applications (ACOMP), Nov. 2019, pp. 97-102, XP033745082.

* cited by examiner

VECTOR TABLE 128

| VECTOR | CONFIDENCE SCORE | PROBABILITY DENSITY | EVALUATION VALUE |
|---|---|---|---|
| $x_0$ | $p_0$ | $D(x_0)$ | $p_0 * \hat{D}(x_0)$ |
| $x_1$ | $p_1$ | $D(x_1)$ | $p_1 * \hat{D}(x_1)$ |
| $x_2$ | $p_2$ | $D(x_2)$ | $p_2 * \hat{D}(x_2)$ |
| $\vdots$ | $\vdots$ | $\vdots$ | $\vdots$ |
| $x_{15}$ | $p_{15}$ | $D(x_{15})$ | $p_{15} * \hat{D}(x_{15})$ |

FIG. 12

CONTROL METHOD AND INFORMATION PROCESSING APPARATUS

CROSS-REFERENCE TO RELATED APPLICATION

This application is a continuation application of International Application PCT/JP2020/001409 filed on Jan. 17, 2020 which designated the U.S., the entire contents of which are incorporated herein by reference.

FIELD

The embodiments discussed herein relate to a control method, an information processing apparatus, and a control program.

BACKGROUND

There are cases where a classification model that predicts the class of an object appearing in an input image is created with machine learning and the created classification model is used for image recognition. For the machine learning to create the classification model, training data is prepared, which associates sample images with their teacher labels indicating the classes to which the sample images belong. Using the training data, the classification model is created, which outputs a confidence score indicating the likelihood that an input image belongs to a specified class. The classification model may be a multilayer neural network such as a convolutional neural network (CNN).

A model inversion attack has been discussed as a security threat to a classification model created with machine learning. The classification model has the following nature: when receiving an image similar to a sample image included in the training data, the classification model probably outputs a very high confidence score as the confidence score of a correct class. Using this nature, the model inversion attack infers a sample image included in the training data by searching for an input image that produces a very high confidence score for a specified class. In the case where the training data includes confidential information to be protected, such as personal information, there arises a risk of inferring and leaking the confidential information.

In this connection, as a security technology using machine learning, there has been proposed an intrusion detection system that inputs traffic data of a network to a neural network and determines an intrusion category on the basis of feature vectors calculated by the neural network.

See, for example, Japanese Laid-open Patent Publication No. 2018-67304.

SUMMARY

According to one aspect, there is provided a control method including: obtaining, by a processor, a classification model and a transformation model, the classification model being configured to calculate, from input image data, a confidence score indicating a likelihood that the input image data belongs to a specified class, the transformation model being a model for transforming an input feature value having fewer dimensions than the input image data into the input image data and being created such that a set of feature values corresponding to a set of image data follows a specific probability distribution; extracting, by the processor, a first feature value according to the specific probability distribution; transforming, by the processor, the first feature value into first image data using the transformation model, and calculating a first confidence score corresponding to the first image data using the classification model; and updating, by the processor, based on the specific probability distribution and the first feature value, a feature value to be input to the transformation model from the first feature value to a second feature value in such a manner that a confidence score to be calculated by the classification model is higher than the first confidence score.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of a vector table.

DESCRIPTION OF EMBODIMENTS

For operating a classification model created with machine learning, it may be desired to evaluate the attack resistance of the classification model by testing a model inversion attack on the classification model. A simple evaluation method is to evaluate whether a correct sample image is reproduced by repeatedly generating an image to be input, accessing the classification model to be evaluated to calculate a confidence score of a specified class, and slightly adjusting the pixel values of the image so as to increase the confidence score.

However, this simple evaluation method of repeatedly making the slight adjustment to the pixel values needs a very large number of accesses to the classification model and high computational complexity. In addition, since images are data with a large number of dimensions and high flexibility, it often happens that an image converges to a local solution that is not similar to a correct sample image, depending on an initial image that is first input. For this reason, there is a problem that it is difficult to evaluate the attack resistance of the classification model with high accuracy within a realistic time frame for analysis.

Hereinafter, embodiments will be described with reference to the accompanying drawings.

First Embodiment

A first embodiment will be described.

Figure 1:
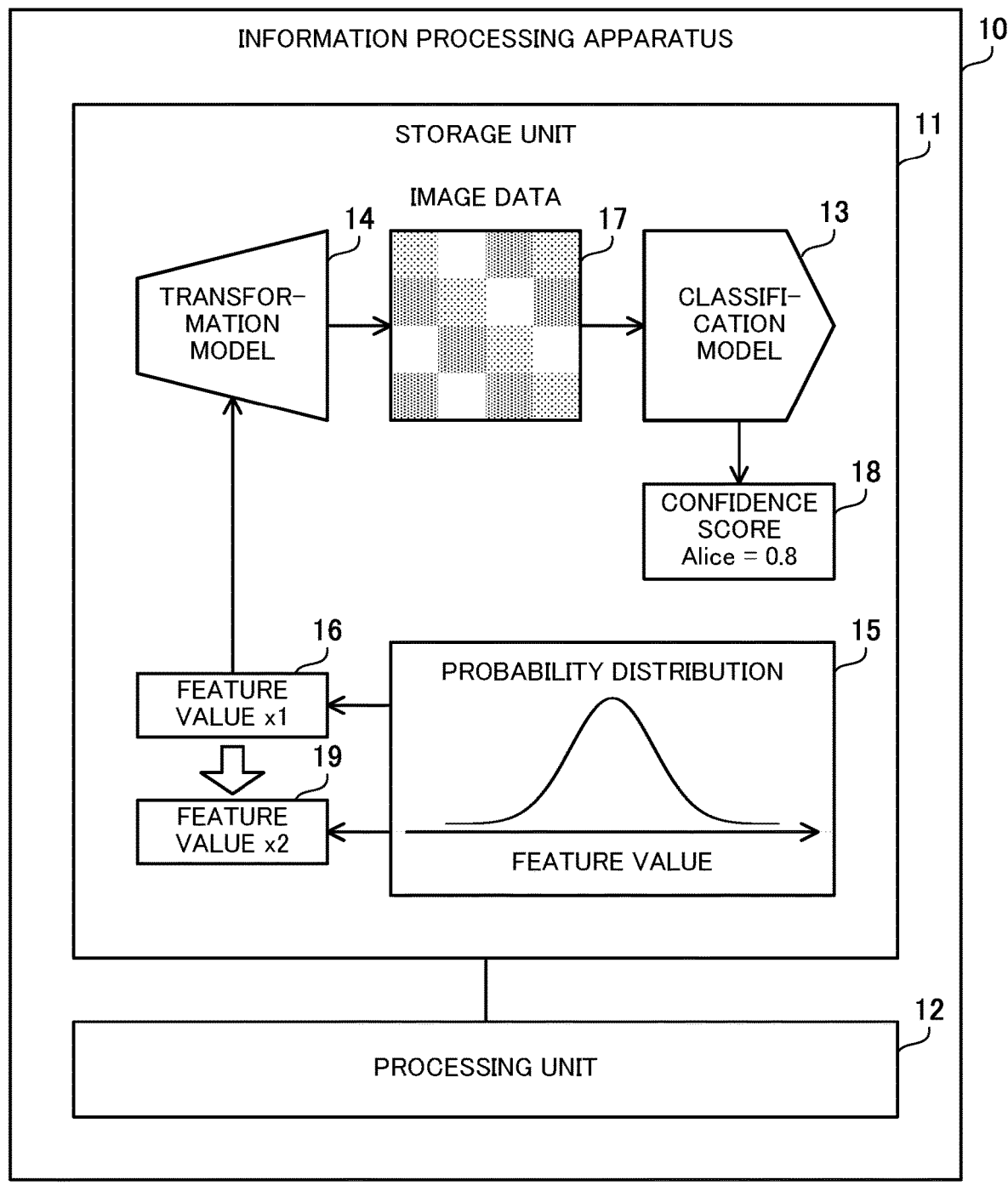
FIG. 1 is a view for describing an example of an information processing apparatus according to a first embodiment.

FIG. 1 is a view for describing an example of an information processing apparatus according to the first embodiment.

An information processing apparatus 10 of the first embodiment evaluates the attack resistance of a learned model created with machine learning. Attacks on the learned model include a model inversion attack. The model inversion attack is to infer training data used in the machine learning by inputting various input data to the learned model and monitoring the outputs of the learned model. The reproducibility of the training data depends on the leaned model under the model inversion attack. The information processing apparatus 10 tests the model inversion attack to confirm the reproducibility of the training data and evaluates the attack resistance of the learned model. The information processing apparatus 10 may be a client apparatus or a server apparatus. The information processing apparatus 10 may be called a computer, a control apparatus, an analysis apparatus, an evaluation apparatus, a machine learning apparatus, or another.

The information processing apparatus 10 includes a storage unit 11 and a processing unit 12. The storage unit 11 may be a volatile semiconductor memory, such as a random access memory (RAM), or a non-volatile storage device, such as a hard disk drive (HDD) or a flash memory. For example, the processing unit 12 is a processor such as a central processing unit (CPU), a graphics processing unit (GPU), or a digital signal processor (DSP). The processing unit 12 may include an application specific integrated circuit (ASIC), a field programmable gate array (FPGA), or another application specific electronic circuit. The processor executes programs stored in a memory such as a RAM (e.g. the storage unit 11). A set of processors may be called "a multiprocessor" or simply "a processor."

The storage unit 11 holds a classification model 13 and a transformation model 14.

The classification model 13 is a learned model to be evaluated, and calculates a confidence score from image data. The image data may be data in tensor form, in which a plurality of pixel values are arranged in a grid structure. The confidence score is a numerical value indicating the likelihood that the input image data belongs to a specified class (image group). The classification model 13 may calculate a plurality of confidence scores corresponding to a plurality of classes. The confidence score of a class may be a probability indicating a relative likelihood that the input image data belongs to the class among the plurality of classes. The total confidence score of the plurality of classes may be 1, and the confidence score of each class may be a real number in the range of 0 to 1, inclusive. A higher confidence score of a class means that the input image data is more highly likely to belong to the class.

The classification model 13 is used for image recognition such as facial recognition or character recognition, for example. The classification model 13 may include parameters whose values are determined by machine learning. The classification model 13 may be a multilayer neural network such as CNN and may include weights given to the edges connecting nodes as the parameters. Training data used for creating the classification model 13 associates sample image data with a teacher label indicating a class to which the sample image data belongs. For example, the sample image data is face photo data, and the teacher label is a correct facial recognition result. As another example, the sample image data is handwritten character data, and the teacher label is a correct character recognition result.

Here, the training data may include confidential information to be protected, such as personal information. For example, the correspondence relationship between face photo data and a person name may be personal information to be protected. Since the classification model 13 represents generalized relationship between a variety of sample image data and teacher labels, it does not directly provide individual confidential information. However, when receiving sample image data, the classification model 13 may output a very high numerical value as the confidence score of a correct class. This is a hint for an attacker to infer the sample image data. Such a hint may create a risk that the model inversion attack succeeds and the confidential information included in the training data is leaked.

In this connection, the test of the model inversion attack using the information processing apparatus 10 may be implemented using a black-box attack that does not need knowledge about the internal structure of the classification model 13. Therefore, the information processing apparatus 10 does not need to hold the classification model 13 as it is, but only needs to be able to access the classification model 13. For example, the information processing apparatus 10 may send image data to another information processing apparatus that releases the classification model 13 and receive a confidence score corresponding to the image data from the other information processing apparatus.

The transformation model 14 transforms a feature value into image data. The image data output from the transformation model 14 is able to be input to the classification model 13. The input feature value has fewer dimensions than the image data. For example, the feature value is a vector with 48 dimensions. The transformation model 14 may be a multilayer neural network. In addition, the transformation model 14 may be created by the information processing apparatus 10 or may be obtained from another information processing apparatus.

Here, the transformation model 14 is created such that a set of feature values corresponding to a set of various image data follows a specific probability distribution 15. The probability distribution 15 may be a normal distribution. For example, the probability distribution 15 is a multivariate normal distribution that is specified by a specific mean vector and variance-covariance matrix. The probability distribution 15 assigns a probability density calculated by a probability density function to each feature value. It may be said that the probability density of a feature value represents a probability of occurrence of image data to which the feature value is transformed. In general, the probability density increases as the feature value gets closer to the mean, and the probability density decreases as the feature value gets farther away from the mean.

The transformation model 14 may be a decoder that is included in a variational autoencoder (VAE). For example, the information processing apparatus 10 collects image data that is identical to or is of the same type as the sample image data used in the machine learning of the classification model 13. The information processing apparatus 10 uses the collected image data to create a variational autoencoder with machine learning. The variational autoencoder is a multilayer neural network including an encoder that calculates feature values from image data and a decoder that restores the image data from the feature values. Since the encoder includes nodes representing the mean and variance of the feature values, a set of feature values calculated by the encoder generally fits a specific probability distribution.

The processing unit 12 tests the model inversion attack on the classification model 13 as follows. The processing unit 12 extracts a feature value 16 (first feature value) according to the probability distribution 15. The feature value 16 may randomly be extracted based on the probability density given by the probability distribution 15. For example, the processing unit 12 generates a random number in the range of 0 to 1, inclusive, and obtains a feature value whose cumulative probability matches the random number. In doing so, a feature value with a higher probability density is extracted with a higher possibility, and a feature value with a lower probability density is extracted with a lower possibility.

The processing unit 12 inputs the feature value 16 to the transformation model 14 to transform the feature value 16 into image data 17. The processing unit 12 inputs the image data 17 to the classification model 13 to calculate a confidence score 18 corresponding to the image data 17. In the case where the classification model 13 calculates confidence scores for a plurality of classes, one target class for inferring sample image data is determined in advance. The target class may be specified by a user. In this connection, the transformation model 14 is combined at the input stage of the classification model 13. In the test of the model inversion attack, the transformation model 14 and classification model 13 are used as a unit, and the image data 17, which is intermediate data, is not necessarily taken out. This enables testing the model inversion attack, using the combination of the transformation model 14 and the classification model 13 as one model.

The processing unit 12 extracts a feature value 19 (second feature value) according to the probability distribution 15, feature value 16, and confidence score 18, and updates the feature value 16 to the feature value 19. The feature value 19 is extracted such that a confidence score to be calculated by the classification model 13 is higher than the confidence score 18. The processing unit 12 may use a gradient-based search algorithm such as a gradient descent-based search algorithm. For example, the processing unit 12 calculates the ratio of change in the confidence score or change in an index value based on the confidence score to change in the feature value as a gradient, and determines the feature value 19 on the basis of the calculated gradient and the feature value 16. At this time, with the probability density corresponding to the feature value 16 as a weight coefficient, the index value may be obtained by multiplying the confidence score 18 by the weight coefficient. By doing so, it is achieved to search feature values preferentially in the direction in which the probability density increases and to reduce the occurrence of generating image data with a low probability of occurrence.

The processing unit 12 inputs the feature value 19 to the transformation model 14. By repeating the update of feature value, the generation of image data, and the calculation of confidence score, the processing unit 12 searches for a feature value that increases the confidence score. The processing unit 12 takes image data obtained by transforming a feature value with a sufficiently high confidence score, as a result of inferring sample image data through the model inversion attack. In this connection, the processing unit 12 may extract a plurality of different feature values as initial values according to the probability distribution 15 and repeat the above processing on each of the plurality of feature values.

As described above, instead of directly searching for image data that increases the confidence score, the processing unit 12 searches for a feature value in the feature space following the probability distribution 15. In the case of using the gradient-based search algorithm, the gradient of confidence score is calculated as a gradient with respect to a feature value in the feature space, instead of as a gradient with respect to the pixel values of image data.

In this connection, a control method executed by the information processing apparatus 10 of the first embodiment is as follows. The information processing apparatus 10 extracts one value according to a specific distribution from a value set including a plurality of values based on features of a plurality of image datasets, the plurality of values being included in the distribution and each having fewer variables than each of the plurality of image datasets. The information processing apparatus 10 obtains a confidence score of a specified group among confidence scores of groups included in a classification inference result obtained by a classification inference model receiving the extracted one value as an input value. The information processing apparatus 10 generates, based on the distribution and the one value, a value such that a confidence score of the specified group to be included in a classification inference result obtained by the classification inference model receiving the generated value as an input value is higher than the obtained confidence score. The "classification inference model" corresponds to a model obtained by combining the transformation model 14 at the input stage of the classification model 13. The "specific distribution" corresponds to the probability distribution 15, for example. The "variables" correspond to the elements of the dimensions included in a vector, for example. The "one value" corresponds to the feature value 16, for example. The "confidence score of a specified group" corresponds to the confidence score 18, for example. The "value such that . . . higher than the obtained confidence score" corresponds to the feature value 19, for example.

The information processing apparatus 10 of the first embodiment extracts the feature value 16 according to the probability distribution 15, and calculates the confidence score 18 through the transformation model 14 and classification model 13. Then, the information processing apparatus 10 updates a feature value to be input to the transformation model 14 from the feature value 16 to the feature value 19 in such a manner that a confidence score to be calculated by the classification model 13 is higher than the confidence score 18.

With the use of the feature space having the specific probability distribution with fewer dimensions than image data, it is achieved to perform efficient search and to reduce the number of accesses to the classification model 13 to input image data thereto, as compared with the case of directly correcting the pixels of the image data. In addition, it is achieved to reduce the possibility of generating image data that is clearly dissimilar to sample image data included in the training data and inputting the generated image data to the classification model 13 and to reduce the possibility that an image converges to a local solution and the inference of the sample image data fails. It is thus achieved to efficiently test the model inversion attack on the classification model 13 and to evaluate the maximum reproducibility of the sample image data with high accuracy. As a result, the accuracy of evaluating the attack resistance of the classification model 13 is improved.

Second Embodiment

A second embodiment will now be described.

An information processing apparatus of the second embodiment tests a model inversion attack on a classification model created with machine learning to evaluate the attack resistance of the classification model. The information processing apparatus of the second embodiment may be a client apparatus or a server apparatus.

Figure 2:
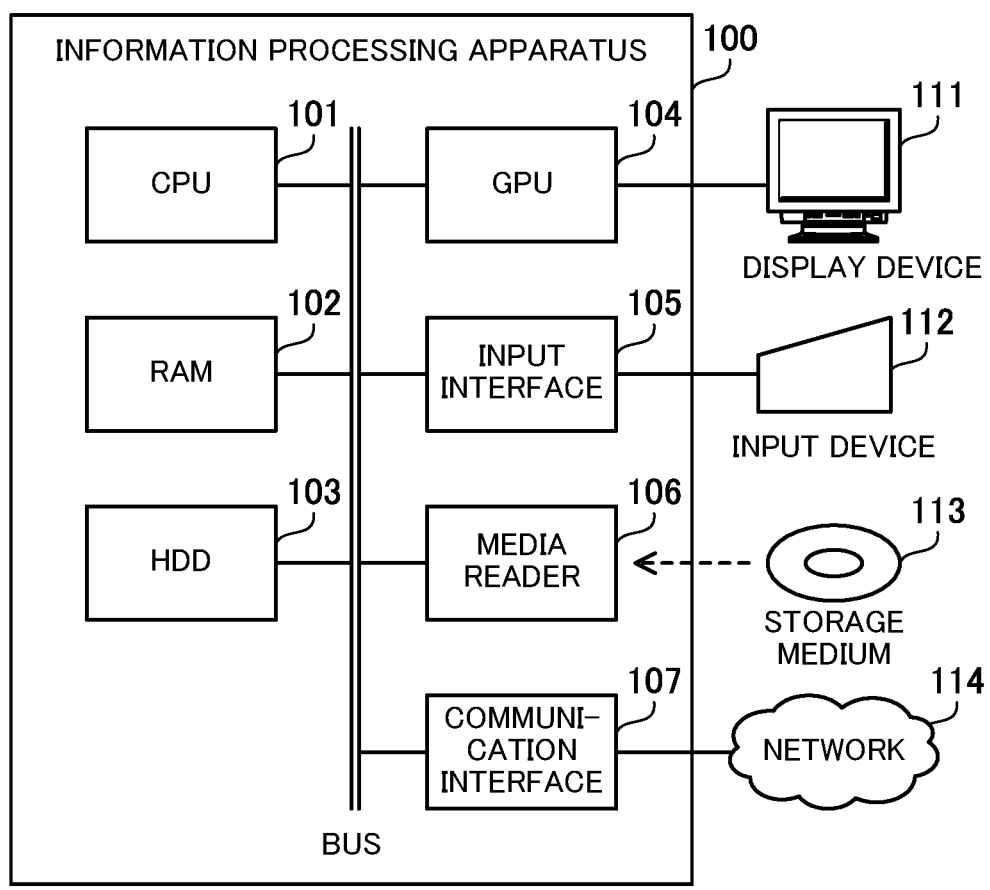
FIG. 2 illustrates an example of hardware of an information processing apparatus according to a second embodiment.

FIG. 2 illustrates an example of hardware of the information processing apparatus according to the second embodiment.

The information processing apparatus 100 of the second embodiment includes a CPU 101, a RAM 102, an HDD 103, a GPU 104, an input interface 105, a media reader 106, and a communication interface 107. These units of the information processing apparatus 100 are connected to a bus. The information processing apparatus 100 corresponds to the information processing apparatus 10 of the first embodiment. The CPU 101 corresponds to the processing unit 12 of the first embodiment. The RAM 102 or HDD 103 corresponds to the storage unit 11 of the first embodiment.

The CPU 101 is a processor that executes program commands. The CPU 101 loads at least part of a program and data from the HDD 103 to the RAM 102 and executes the program. The CPU 101 may be provided with a plurality of processor cores, and the information processing apparatus 100 may be provided with a plurality of processors. A set of multiple processors may be called "a multiprocessor," or simply "a processor."

The RAM 102 is a volatile semiconductor memory that temporarily holds programs executed by the CPU 101 and data used by the CPU 101 in processing. The information processing apparatus 100 may be provided with a different kind of memory than RAM or a plurality of memories.

The HDD 103 is a non-volatile storage device that holds software programs such as an operating system (OS), middleware, and application software, and data. The information processing apparatus 100 may be provided with a different kind of storage device such as a flash memory or a solid state drive (SSD) or a plurality of storage devices.

The GPU 104 outputs images to a display device 111 connected to the information processing apparatus 100 in accordance with commands from the CPU 101. Any kind of display device such as a cathode ray tube (CRT) display, a liquid crystal display (LCD), an organic electro-luminescence (OEL) display, or a projector may be used as the display device 111. Other than the display device 111, an output device such as a printer may be connected to the information processing apparatus 100.

The input interface 105 receives input signals from an input device 112 connected to the information processing apparatus 100. Any kind of input device such as a mouse, a touch panel, a touchpad, or a keyboard may be used as the input device 112. A plurality of kinds of input devices may be connected to the information processing apparatus 100.

The media reader 106 is a reading device that reads programs and data from a storage medium 113. Any kind of storage medium, i.e., a magnetic disk such as a flexible disk (FD) or an HDD, an optical disc such as a compact disc (CD) or a digital versatile disc (DVD), or a semiconductor memory may be used as the storage medium 113. For example, the media reader 106 copies, for example, a program and data read from the storage medium 113 to another storage medium such as the RAM 102 or the HDD 103. The read program is executed by the CPU 101, for example. The storage medium 113 may be a portable storage medium and may be used to distribute programs and data. In addition, the storage medium 113 and HDD 103 may be referred to as computer-readable storage media.

The communication interface 107 is connected to a network 114 and communicates with other information processing apparatuses over the network 114. The communication interface 107 may be a wired communication interface that is connected to a wired communication device such as a switch or a router or may be a wireless communication interface that is connected to a wireless communication device such as a base station or an access point.

The following describes the classification model.

Figure 3:
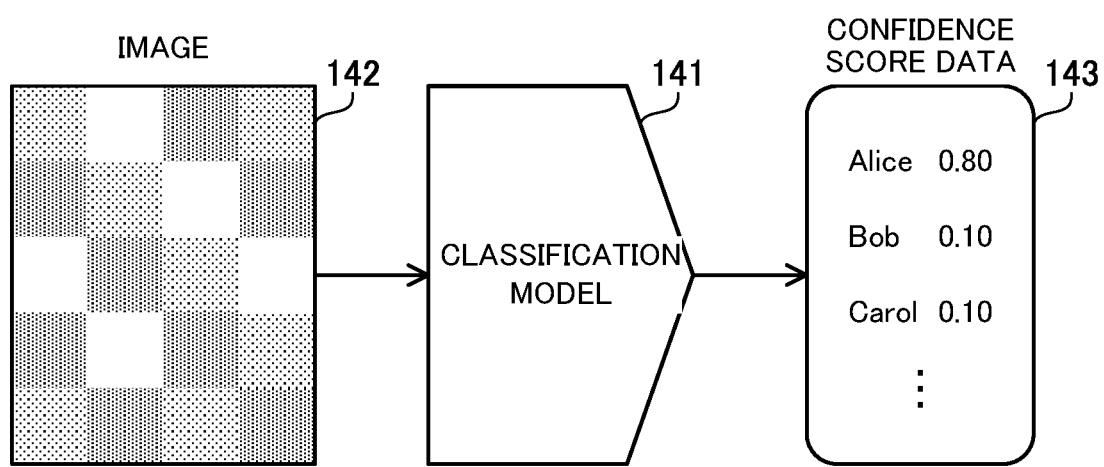
FIG. 3 illustrates an example of input and output of a classification model.

FIG. 3 is a view illustrating an example of input and output of the classification model.

The classification model 141 is created with machine learning. The classification model 141 is a learned model that receives an image 142 and outputs confidence score data 143. The classification model 141 classifies the image 142 into any class and is used for image recognition. The second embodiment mainly describes facial recognition for determining the name of a person from a face photo of the person.

The image 142 is a set of pixel values arranged in a grid. The pixel values are numerical values that each indicate the luminance of a pixel. The image 142 is represented as a tensor, which is a multidimensional array. In the case where the image 142 is a monochrome image, the image 142 is represented as a binary tensor in two-dimensional array having a predetermined height and a predetermined width. In the case where the image 142 is a color image, the image 142 is represented as a ternary tensor in three-dimensional array having three channels corresponding to a predetermined height, a predetermined width, and red-green-blue (RGB). The height and width of the image 142 to be input to the classification model 141 are adjusted to a predetermined height and width in advance. More specifically, the number of pixel values to be input to the classification model 141 is equal to the value calculated by "height×width×the number of channels." This value calculated by "height× width×the number of channels" indicates the number of dimensions for the input.

The confidence score data 143 is output data that lists a plurality of confidence scores corresponding to a plurality of classes. The plurality of classes are candidates for a class to which an image belongs, and are image types. In the case of facial recognition, the plurality of classes are different names of people. The confidence score of a class is a numerical value indicating the likelihood that the image 142 belongs to the class. A higher confidence score means a higher likelihood that the image 142 belongs to the class, and a lower confidence score means a lower likelihood that the image 142 belongs to the class. The confidence score of each class is a real number in the range of 0 to 1, inclusive. The total confidence score of the plurality of classes is 1. For example, with respect to the image 142 that is a face photo, the confidence score of Alice is determined to be 0.8, the confidence score of Bob is determined to be 0.10, and the confidence score of Carol is determined to be 0.10. In this case, the person appearing in the image 142 is highly likely to be Alice.

The classification model 141 is a multilayer neural network such as a convolutional neural network (CNN), for example. In general, CNN includes one or more convolutional layers, one or more pooling layers, and one or more fully connected layers.

The convolutional layers each perform a multiply-accumulate operation between an input tensor and a filter called a kernel and create an output tensor called a feature map. In a typical convolutional layer, the height and width of a kernel are less than those of an input tensor, and the height and width of an output tensor are less than or equal to those of the input tensor. In each convolutional layer, the kernel is placed on the input tensor, and each element of the kernel is multiplied by the overlapping element of the input tensor, and the products are summed up. The sum is taken as an element of the output tensor corresponding to an element of the input tensor on which the center of the kernel is placed. The convolutional layer repeats the multiply-accumulate operation while shifting the kernel on the input tensor.

The pooling layers each combine a plurality (for example, 2×2=4) of continuous elements in an input tensor into one element to create an output tensor whose height and width are less than those of the input tensor. Pooling operations include max pooling of selecting the maximum value of a plurality of elements, and average pooling of calculating the average of a plurality of elements. The fully connected layers calculate the weighted sum of all elements of an input tensor to obtain one numerical value.

The above-described convolutional operation, pooling operation, and fully connected operation are implemented by a multilayer neural network. The multilayer neural network includes an input layer for receiving input data, an output layer for outputting output data, and one or more intermediate layers between the input layer and the output layer. One layer contains nodes corresponding to neurons, and edges corresponding to synapses are formed between the nodes of adjacent layers. A weight is assigned to each edge. The weights of the edges are parameters calculated by machine learning.

For training the classification model 141, training data including a plurality of combinations, each of which includes a sample image and a teacher label indicating a class, is used. The teacher label is given by a user. In the case of facial recognition, a set of face photos respectively associated with the names of people is used as the training data.

In the case where the classification model 141 is a multilayer neural network, for example, an error backpropagation method is used for calculating the weight of each edge. In the error backpropagation method, a process of inputting the pixel values of a sample image to the nodes of the input layer, multiplying the output values from the nodes of a previous layer by weights, and inputting the resultant to the nodes of the next layer is repeated from the input layer to the output layer. The output value of the output layer and the teacher label are compared with each other to calculate an error. Then, the gradient (partial derivative) of the error with respect to the weight of an edge is calculated and the weight is updated on the basis of the gradient of the error, in order from the one closest to the output layer. The gradient of the error is propagated backwards from the output layer to the input layer. The input of sample image, the calculation of error, and the update of weights are repeated on a large number of sample images included in the training data. In the manner described above, the classification model 141 is created from the training data.

By the way, the training data used for creating the classification model 141 may include confidential information that needs to be protected, such as personal information.

For example, combinations of face photo and name may be personal information that needs to be protected. In this regard, the classification model 141 created from the training data only outputs confidence scores corresponding to input images and does not directly provide the combinations of sample image and teacher label included in the training data. Therefore, as long as the training data is treated as being confidential, such confidential information is not leaked immediately when the classification model 141 is released.

However, by a model inversion attack on the classification model 141, a sample image corresponding to a specified class may be inferred based on the confidence score of the specified class. This is because, due to the nature of the machine learning, when a sample image included in the training data is input to the classification model 141 as it is, the classification model 141 outputs an exceedingly high confidence score for a correct class. If the model inversion attack achieves high reproducibility of sample images, there is a risk of leakage of confidential information related to the sample images.

The reproducibility of sample images by the model inversion attack depends on various factors including the model structure of the classification model 141, the amount of training data, the nature of what the classification model 141 predicts. Therefore, before the classification model 141 is released, the information processing apparatus 100 evaluates the resistance of the classification model 141 against the model inversion attack.

The information processing apparatus 100 tests the model inversion attack on the classification model 141, evaluates the maximum reproducibility of a sample image corresponding to a specified class, and evaluates the attack resistance of the classification model 141. Low reproducibility means that the classification model 141 has high attack resistance (low vulnerability), whereas high reproducibility means that the classification model 141 has low attack resistance (high vulnerability). If low attack resistance is obtained, some countermeasures are taken to reduce the risk of confidential information leakage before the classification model 141 is released. For example, countermeasures considered include: lowering the resolution (the number of significant digits) of a confidence score that is output from the classification model 141; and outputting only a class name with the highest confidence score without outputting the confidence score.

Here, the problem is how to test the model inversion attack. The second embodiment uses a black-box attack that analyzes the input and output of the classification model 141 without using information on the internal structure of the classification model 141, considering the situation where an attacker is not able to obtain the classification model 141. This is because the functions of the classification model 141 may be released as a service on a network, instead of distributing the classification model 141 as it is.

As a simple attack method premised on the black-box attack, one method considered is to repeatedly input an image to the classification model 141 to obtain the confidence score of a specified class and update the image so as to increase the confidence score until the confidence score is sufficiently high. In the case of using a gradient-based search algorithm such as a gradient descent-based search algorithm, the gradient of confidence score with respect to the pixel values of an image (the partial derivatives of confidence score with respect to the pixel values) is calculated, and the pixel values are updated based on the gradient.

In the above simple attack method, however, the number of updates of an image increases and the number of accesses to the classification model 141 to input the image thereto increases in order to obtain a sufficiently high confidence score, because images have a large number of dimensions and high flexibility. For example, the number of accesses to the classification model 141 may reach several hundreds of millions, and even if the time taken to make one access is one millisecond, it took several days to complete the inference. In addition, in the case where an initial image to be first input is an image that is oddly different from a desired sample image, such as a completely white image or a completely black image, the image update may converge to a local solution. In this case, an image obtained by maximizing the confidence score may be greatly different from the sample image, meaning that the model inversion attack fails.

To solve this problem, the information processing apparatus 100 tests the model inversion attack using a variational autoencoder. The information processing apparatus 100 efficiently evaluates the maximum reproducibility that the model inversion attack achieves to infer a sample image included in the training data. Therefore, the accuracy of evaluating the attack resistance of the classification model 141 is improved. The following describes the variational autoencoder that is used in the second embodiment.

Figure 4:
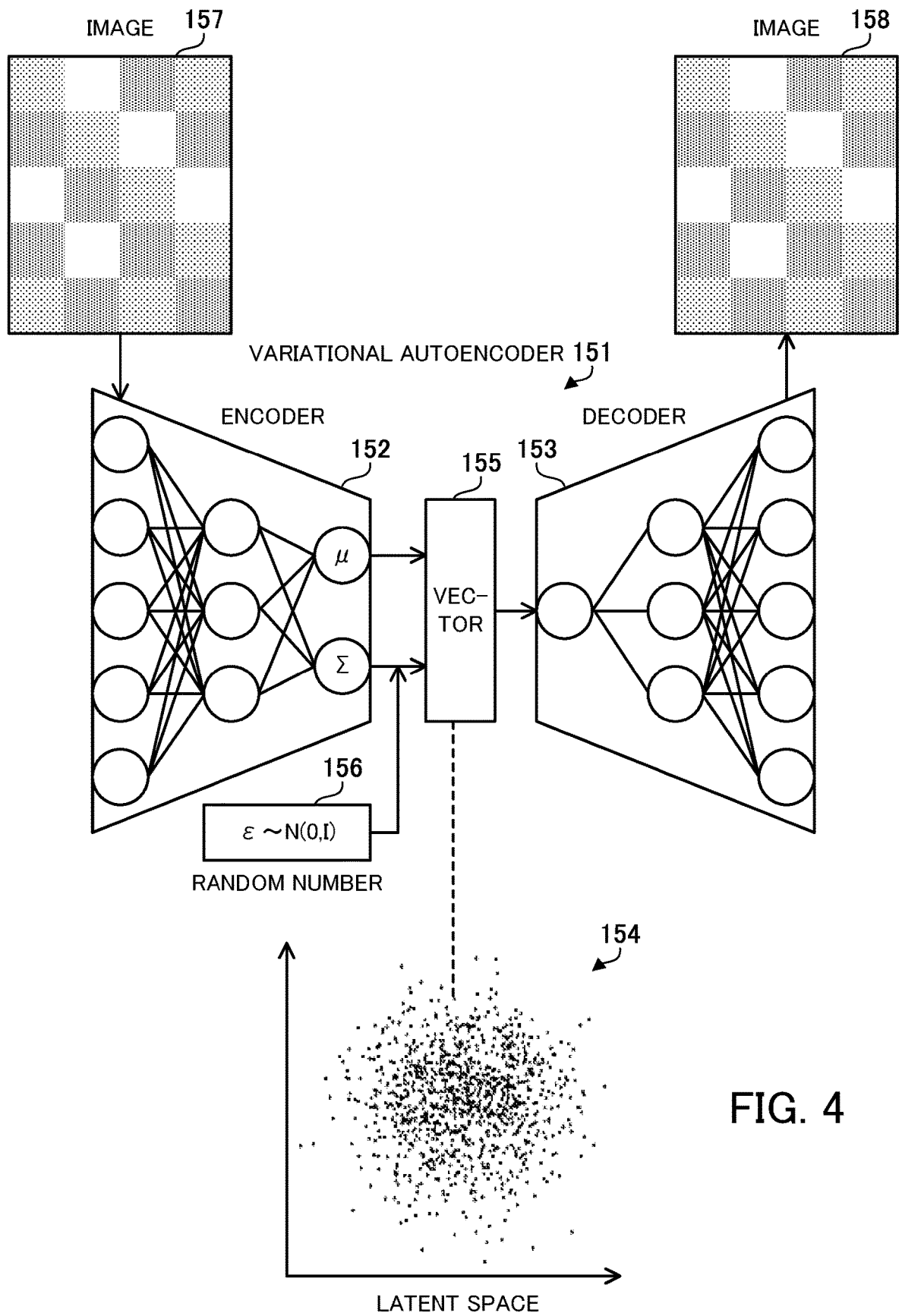
FIG. 4 illustrates an example of a variational autoencoder.

FIG. 4 illustrates an example of a variational autoencoder.

A variational autoencoder 151 is one type of autoencoder. An autoencoder is a multilayer neural network that is created with machine learning such that input data and output data are identical to each other. The autoencoder compresses the input data into a vector having fewer dimensions than the input data, and restores the output data from the vector. Here, the variational autoencoder 151 is created such that a set of vectors follows a specific probability distribution. The variational autoencoder 151 includes an encoder 152 and a decoder 153.

The encoder 152 receives an image 157 as an input. The encoder 152 is a multilayer neural network with a plurality of layers. An output from the encoder 152 has fewer dimensions than the input to the encoder 152. For example, in the layers of the encoder 152, the number of dimensions decreases stepwise in the direction from the input layer toward the output layer. The decoder 153 outputs an image 158. The height and width of the image 158 are identical to those of the image 157. The image 158 is ideally identical to the image 157. The decoder 153 is a multilayer neural network with a plurality of layers. An output from the decoder 153 has more dimensions than an input to the decoder 153. For example, in the layers of the decoder 153, the number of dimensions increases stepwise in the direction from the input layer toward the output layer.

A vector 155 is calculated between the encoder 152 and the decoder 153. The vector 155 is a representation of the features of the image 157 in low dimensions. For example, the vector 155 has 48 dimensions. The vector 155 may be called a latent variable, feature value, feature vector, or another. The vector 155 is mapped to a latent space 154. The latent space 154 is a vector space such as a 48-dimensional space.

When a set of images of the same type (for example, a set of face photos or a set of handwritten characters) is input to the encoder 152, a set of vectors corresponding to the set of images has a specific probability distribution such as a normal distribution in the latent space 154. For example, the probability distribution in the latent space 154 is a multivariate normal distribution that has the vector 155 as a probability variable and that is specified by a specific mean vector and variance-covariance matrix. Here, a probability distribution other than the normal distribution may be assumed. The probability of occurrence of a specified vector in the set of vectors is approximated to a probability density calculated by a probability density function. In general, a vector closer to the mean vector has a higher probability density, whereas a vector farther away from the mean vector has a lower probability density.

To make the vector 155 follow the specific probability distribution, the encoder 152 calculates a value representing the mean vector ($\mu$) and a value representing the variance-covariance matrix ($\Sigma$) for the input image 157. Sampling for extracting the vector 155 is performed from the probability distribution specified by the values calculated by the encoder 152. For example, a random number 156 (random number $\varepsilon$) is generated from a standard normal distribution $N(O, I)$, where the mean vector is a zero vector (O) and the variance-covariance matrix is a unit matrix I. The random number 156 is randomly extracted according to the probability density given by the standard normal distribution. A deviation is calculated by multiplying the variance-covariance matrix $\Sigma$ by the random number $\varepsilon$, and the mean vector $\mu$ and the deviation are added to thereby calculate the vector 155.

In creating the variational autoencoder 151 with the machine learning, images that are identical to or are of the same type as the sample images used in the machine learning of the classification model 141 are collected. In the case where the training data itself is obtainable, the sample images included in the training data may be used. However, in the actual model inversion attack, an attacker is not able to obtain the training data, and therefore images of the same types as the sample images are preferably used, in view of the attack resistance evaluation. For example, in the case where the classification model 141 performs facial recognition, the information processing apparatus 100 collects face photos available on the Internet. On the other hand, for example, in the case where the classification model 141 performs character recognition, the information processing apparatus 100 collects handwritten characters available on the Internet.

The information processing apparatus 100 uses the collected images as input images and as output images for the variational autoencoder 151 to determine parameters included in the variational autoencoder 151. Thereby, the weights of the edges included in the encoder 152 and decoder 153 are determined. For example, the weights of the edges are updated with the above-described error back-propagation method.

After the parameters are determined, the information processing apparatus 100 inputs again the set of images used for creating the variational autoencoder 151 to the encoder 152 to calculate a set of vectors corresponding to the set of images. The information processing apparatus 100 then calculates a mean vector and a variance-covariance matrix from the set of vectors. The mean vector is the mean of the vector elements for each dimension. The variance-covariance matrix is a square matrix whose length on each side is the number of dimensions. The diagonal components in the variance-covariance matrix represent the variance of the element on each dimension. The off-diagonal components in the variance-covariance matrix represent the covariance between the elements on two different dimensions.

The information processing apparatus 100 assumes that the entire latent space 154 in which the vectors corresponding to various images are plotted follow the probability distribution specified by the mean vector and variance-covariance matrix. This probability distribution assumed here is a multivariate normal distribution, for example. By creating the variational autoencoder 151 in the above-described manner, the decoder 153 whose inputs follow the specific probability distribution is obtained. As will be described below, instead of directly searching for an image that increases a confidence score, the information processing apparatus 100 searches for a vector in the latent space 154.

The following describes a training data inference method as a model inversion attack. In the following, four examples of the training data inference method will be described.

Figure 5:
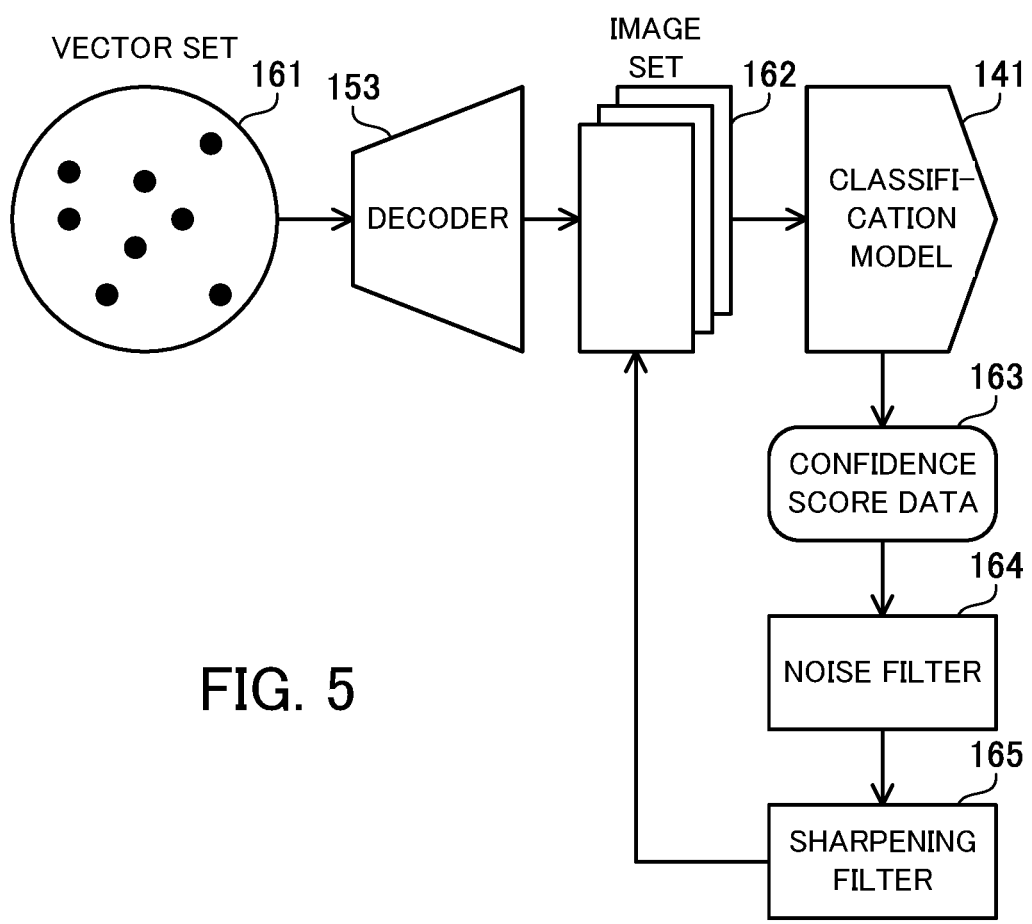
FIG. 5 illustrates a first example of training data inference.

FIG. 5 illustrates a first example of training data inference.

In a first training data inference method, the information processing apparatus 100 extracts a vector set 161 from the latent space 154 according to a probability distribution calculated in the creation of the variational autoencoder 151. The information processing apparatus 100 randomly extracts a plurality of vectors in such a manner that a vector with a higher probability density is more likely to be extracted and a vector with a lower probability density is less likely to be extracted. The vector set 161 includes 16 vectors, for example.

The information processing apparatus 100 inputs each vector included in the vector set 161 to the decoder 153 to generate an image set 162 corresponding to the vector set 161. For example, the image set 162 includes 16 images. The information processing apparatus 100 inputs each image included in the image set 162 to the classification model 141 to generate confidence score data 163. The confidence score data 163 includes a row of confidence scores for each image included in the image set 162. Each row of confidence scores lists a plurality of confidence scores corresponding to a plurality of classes.

The information processing apparatus 100 focuses on one specified class and extracts the confidence score of the class focused on from the confidence score data 163. A class to be focused on is determined in advance for testing the model inversion attack. For example, the class to be focused on is determined by the user. For each image included in the image set 162, the information processing apparatus 100 calculates the gradient of confidence score on the basis of the pixel values, that is, the partial derivatives of confidence score with respect to the pixel values. The gradient of confidence score indicates a change in the confidence score caused when the pixel values are changed by a small amount. The information processing apparatus 100 updates the pixel values of the image on the basis of the gradient so as to increase the confidence score. For example, the information processing apparatus 100 calculates an update amount by multiplying the gradient by a predetermined learning rate λ, and changes the pixel values by the update amount.

However, an image whose pixel values are changed artificially is likely to be an unnatural image. To deal with this, the information processing apparatus 100 inputs the image with changed pixel values to a noise filter 164 to remove noise from the image. The noise filter 164 is a denoising autoencoder (DAE), for example. The denoising autoencoder is an autoencoder that is created with machine learning to receive an image with noise as an input image and generate an original image without noise as an output image. In addition, the information processing apparatus 100 inputs the image having passed through the noise filter 164 to a sharpening filter 165. The sharpening filter 165 is an image filter that enhances edges, such as a Laplacian filter. This is because an image is likely to be vague after passing through the noise filter 164.

The image set 162 is updated to the images having passed through the sharpening filter 165. The information processing apparatus 100 repeatedly executes a loop of generating the confidence score data 163 through the classification model 141 and updating the image set 162. The information processing apparatus 100 may stop the loop when the number of iterations of the loop reaches a predetermined value. Alternatively, the information processing apparatus 100 may stop the loop when the maximum confidence score exceeds a threshold. Yet alternatively, the information processing apparatus 100 may stop the loop when the confidence score no longer increases.

The information processing apparatus 100 outputs an image corresponding to the maximum confidence score among the confidence scores calculated so far, as a result of inferring a sample image corresponding to the class focused on. Alternatively, the information processing apparatus 100 may output a plurality of images in descending order of confidence score, or may output all images whose confidence scores are greater than a threshold.

In the first training data inference method, the initial values of the image set 162 are determined by extracting the vector set 161 from the latent space 154 according to the probability distribution. This reduces the occurrence of inputting irrelevant images that are clearly dissimilar to sample images to the classification model 141. It is thus achieved to shorten the search time by reducing the number of accesses to the classification model 141 and also to increase the possibility of finally reaching an image close to a sample image.

Figure 6:
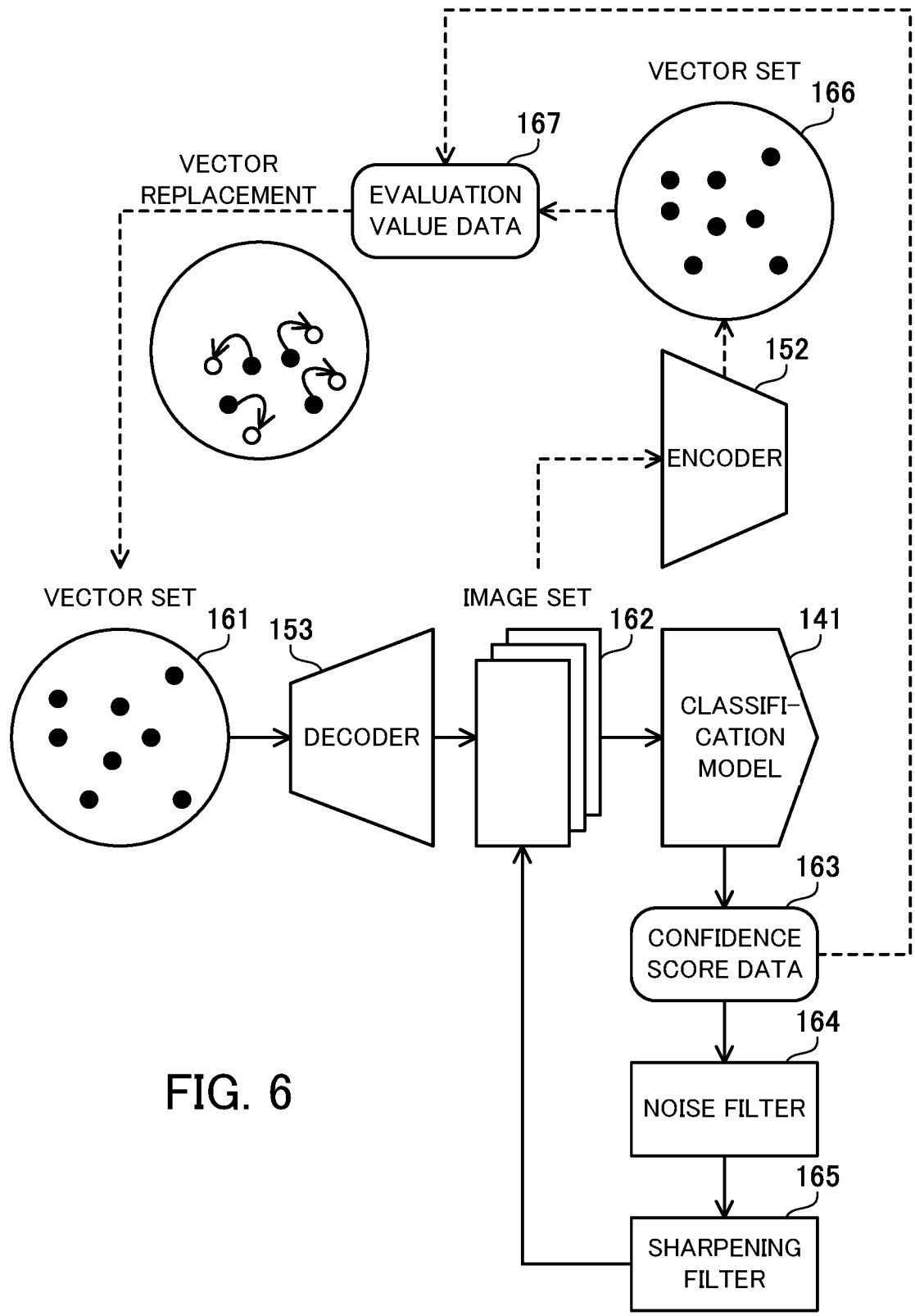
FIG. 6 illustrates a second example of training data inference.

FIG. 6 is a view illustrating a second example of training data inference.

In a second training data inference method, the information processing apparatus 100 performs the same processing as done in the first training data inference method, as an inner loop. More specifically, the information processing apparatus 100 generates a vector set 161, transforms the vector set 161 into an image set 162 using the decoder 153, and generates confidence score data 163 from the image set 162 using the classification model 141. Then, the information processing apparatus 100 updates the image set 162 so as to increase confidence scores.

At this time, the information processing apparatus 100 executes an outer loop each time the number of iterations of the inner loop reaches a predetermined value. As the outer loop, the information processing apparatus 100 inputs each latest image included in the image set 162 to the encoder 152 to generate a vector set 166 corresponding to the image set 162. Since the images included in the image set 162 have been updated, the vector set 166 is different from the vector set 161. Note that the vector set 166 contains the same number of vectors as the vector set 161, and for example, contains 16 vectors.

The information processing apparatus 100 generates evaluation value data 167 on the basis of the vector set 166 and confidence score data 163. The evaluation value data 167 indicates the evaluation value of each vector included in the vector set 166. The information processing apparatus 100 may use the confidence score of a class focused on, as an evaluation value. Alternatively, the information processing apparatus 100 may take the probability density of a vector given by the probability distribution as a regularization term and use the product of the confidence score and the regularization term as an evaluation value. With the use of the probability density as the regularization term, the evaluation of a vector corresponding to a natural image with a higher probability of occurrence is likely to be high, and the evaluation of a vector corresponding to an unnatural image with a low probability of occurrence is likely to be low. In addition, the information processing apparatus 100 may set an upper limit value for the regularization term, clip a probability density greater than the upper limit value to the upper limit value, and uses the upper limit value as the regularization term, as will be described later.

The information processing apparatus 100 updates the vector set 161 on the basis of the calculated evaluation values. For example, the information processing apparatus 100 sorts the vectors included in the vector set 166 in descending order of evaluation value, selects a predetermined number of vectors or a predetermined percentage of vectors in descending order of evaluation value, and deletes the unselected vectors. Alternatively, the information processing apparatus 100 randomly selects a predetermined number of vectors or a predetermined percentage of vectors from the vector set 166 in such a manner that the vectors are selected according to the probabilities based on the ratio of their evaluation values. A set of the vectors selected here is taken as the next vector set 161. In this case, the vector set 161 contains fewer vectors. During the iterations of the outer loop, the number of vectors may decrease stepwise.

In addition, the information processing apparatus 100 may extract new vectors from the latent space 154 and add them to the vector set 161 to replace the deleted vectors. During the iterations of the outer loop, as many new vectors as the deleted vectors may be added to maintain the number of vectors included in the vector set 161 constant. In this case, the information processing apparatus 100 may extract new vectors in the vicinity of the remaining vectors, which have not been deleted. For example, the information processing apparatus 100 defines a probability distribution with a small standard deviation with a remaining vector as a center, and randomly extracts a new vector according to the probability distribution. The information processing apparatus 100 may delete half of the vectors from the vector set 166 and extract one new vector in the vicinity of each of the remaining vectors.

When the number of iterations of the outer loop reaches a threshold value, the training data inference is completed. The information processing apparatus 100 outputs, as a result of inferring a sample image, an image corresponding to the maximum confidence score (or evaluation value) among the confidence scores (or evaluation values) calculated so far. Alternatively, the information processing apparatus 100 may output a plurality of images in descending order of confidence score (or evaluation value) or to output all images whose confidence scores (or evaluation values) are greater than a threshold.

In the second training data inference method, the update of images corresponding to vectors with low evaluation values are aborted in the midway. This reduces wasteful image search with a low possibility of reaching a sample image. In addition, in place of vectors for which the update of images is aborted, vectors adjacent to vectors with high evaluation values are added as initial values. Therefore, it is achieved to shorten the search time by reducing the number of accesses to the classification model 141 and to increase the possibility of finally reaching an image close to a sample image.

Figure 7:
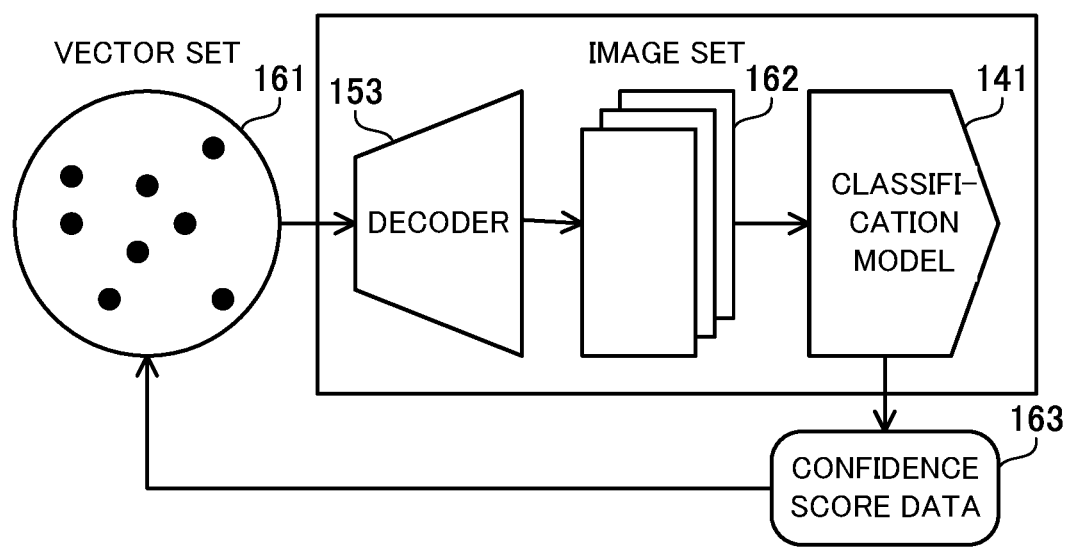
FIG. 7 illustrates a third example of training data inference.

FIG. 7 illustrates a third example of training data inference.

As in the first training data inference method, a third training data inference method performs single-loop search. However, in place of the image set 162, the vector set 161 is searched and updated during the search. In the third training data inference method, the image set 162 is intermediate data that is given from the decoder 153 to the classification model 141 and is not used for the other purposes. Therefore, a combination of the decoder 153 at the input stage of the classification model 141 may be virtually taken as one model. This virtual model receives a vector in the latent space 154 as an input and outputs a confidence score corresponding to the input vector.

The information processing apparatus 100 generates a vector set 161, transforms the vector set 161 into an image set 162 using the decoder 153, and generates confidence score data 163 from the image set 162 using the classification model 141. It may be said that a model that is the combination of the decoder 153 and classification model 141 generates the confidence score data 163 from the vector set 161.

The information processing apparatus 100 calculates, for each vector included in the vector set 161, the gradient of confidence score on the basis of the elements of the vector, that is, the partial derivatives of confidence score with respect to the elements of the vector. The gradient of confidence score indicates a change in the confidence score caused when the elements of the vector are changed by a small amount. In this connection, the information processing apparatus 100 may take the probability density of the vector given by the probability distribution as a regularization term and use the product of the confidence score and the regularization term as the gradient. In addition, the information processing apparatus 100 may set an upper limit value for the regularization term, clips a probability density greater than the upper limit value to the upper limit value, and use the upper limit value as the regularization term, as will be described later. The information processing apparatus 100 updates the vector on the basis of the gradient so as to increase the confidence score. For example, the information processing apparatus 100 calculates an update amount by multiplying the gradient by a predetermined learning rate $\lambda$, and changes the elements of the vector by the update amount.

The information processing apparatus 100 may stop the loop when the number of iterations of the loop reaches a predetermined value. Alternatively, the information processing apparatus 100 may stop the loop when the maximum confidence score (or the maximum product of confidence score and regularization term) exceeds a threshold. In addition, the information processing apparatus 100 may stop the loop when the confidence score (or the product of confidence score and regularization term) no longer increases. The information processing apparatus 100 outputs, as a result of inferring a sample image, an image corresponding to a vector with the maximum confidence score (or the maximum product of confidence score and regularization term) among the confidence scores (or the products of confidence score and regularization term) calculated so far. Alternatively, the information processing apparatus 100 may output a plurality of images corresponding to a plurality of vectors in descending order of confidence score (or the product of confidence score and regularization term), or may output images corresponding to all vectors whose confidence scores (or the products of confidence score and regularization term) are greater than a threshold.

In the third training data inference method, the latent space 154 with fewer dimensions than the image space is used as a search space, in place of the image space that is a set of pixel values. Therefore, it is achieved to shorten the search time by reducing the number of accesses to the classification model 141. In addition, the use of the latent space 154 having a specific probability distribution reduces the occurrence of inputting irrelevant images to the classification model 141 and increases the possibility of finally reaching an image close to a sample image.

Figure 8:
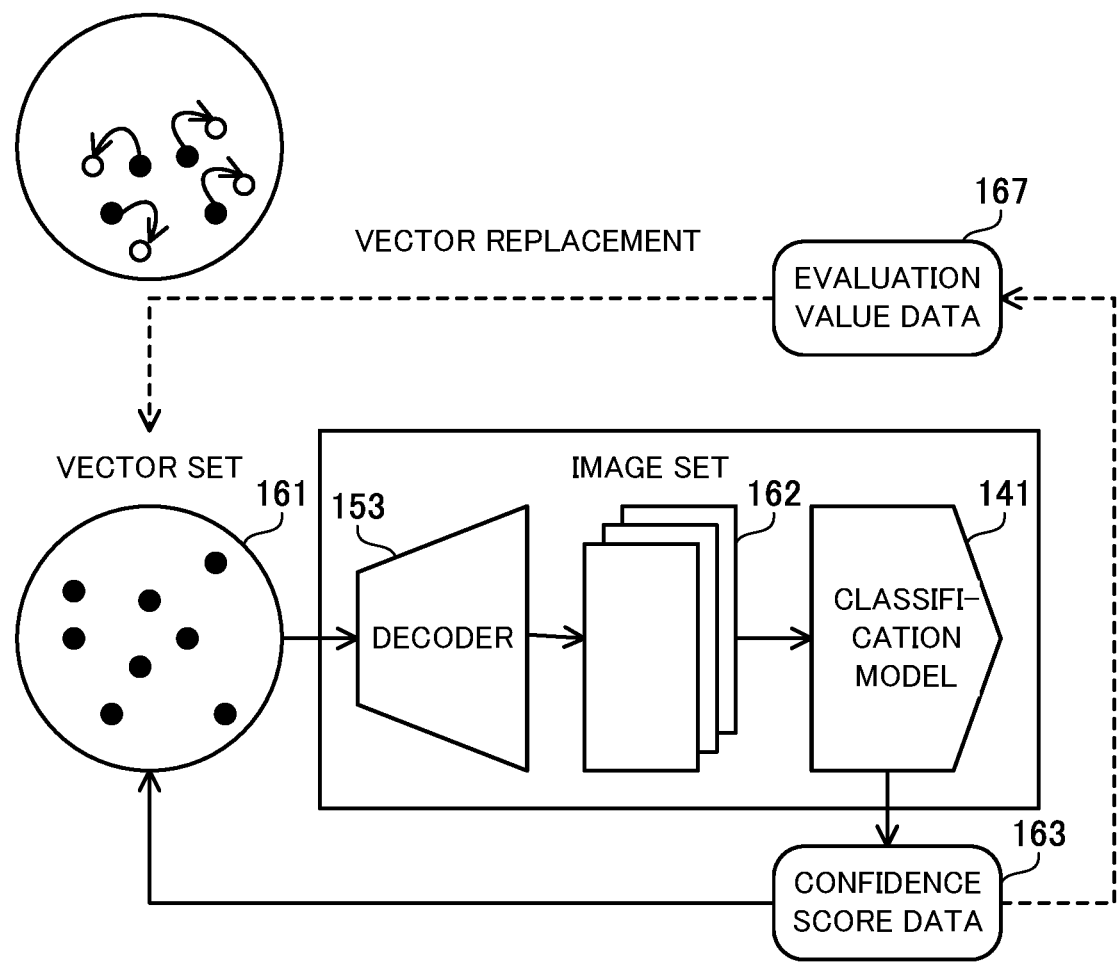
FIG. 8 illustrates a fourth example of training data inference.

FIG. 8 illustrates a fourth example of training data inference.

In a fourth training data inference method, the information processing apparatus 100 performs the same processing as done in the third training data inference method, as an inner loop. More specifically, the information processing apparatus 100 generates a vector set 161, transforms the vector set 161 into an image set 162 using the decoder 153, and generates confidence score data 163 from the image set 162 using the classification model 141. Then, the information processing apparatus 100 updates the vector set 161 so as to increase confidence scores (or the products of confidence score and regularization term).

Here, each time the number of iterations of the inner loop reaches a predetermined value, the information processing apparatus 100 executes an outer loop in the same manner as the second training data inference method. Note that, since not the image set 162 but the vector set 161 is searched, the encoder 152 is not needed. More specifically, the information processing apparatus 100 generates evaluation value data 167 on the basis of the vector set 161 and confidence score data 163. The evaluation value data 167 indicates the evaluation value of each vector included in the vector set 161. The evaluation value may be the confidence score itself or the product of confidence score and regularization term. The regularization term may be the probability density of a vector or may be a predetermined upper limit value to which the probability density is clipped.

The information processing apparatus 100 updates the vector set 161 on the basis of the calculated evaluation values. For example, the information processing apparatus 100 selects a predetermined number of vectors or a predetermined percentage of vectors in descending order of evaluation value, and deletes the unselected vectors. Alternatively, the information processing apparatus 100 may randomly select a predetermined number of vectors or a predetermined percentage of vectors from the vector set 161 in such a manner that the vectors are selected according to the probabilities based on the ratio of their evaluation values, and delete the unselected vectors. To replace the deleted vectors, the information processing apparatus 100 may extract new vectors from the latent space 154 and add them to the vector set 161. For example, the information processing apparatus 100 extracts new vectors in the vicinity of the remaining vectors, which have not been deleted. The information processing apparatus 100 may delete half of the vectors from the vector set 161 and extract one new vector in the vicinity of each of the remaining vectors.

For example, the number of iterations of the inner loop is 4. The number of iterations of the outer loop is in the range of 3 to 6, for example. When the number of iterations of the outer loop reaches a threshold value, the training data inference is completed. The information processing apparatus 100 outputs, as a result of inferring a sample image, an image corresponding to the maximum confidence score (or the maximum evaluation value) among the confidence scores (or evaluation values) calculated so far. In this connection, the information processing apparatus 100 may output a plurality of images in descending order of confidence score (or evaluation value) or may output all images whose confidence scores (or evaluation values) are greater than a threshold.

The following is a supplementary description for the regularization term by which a confidence score is multiplied.

Figure 9:
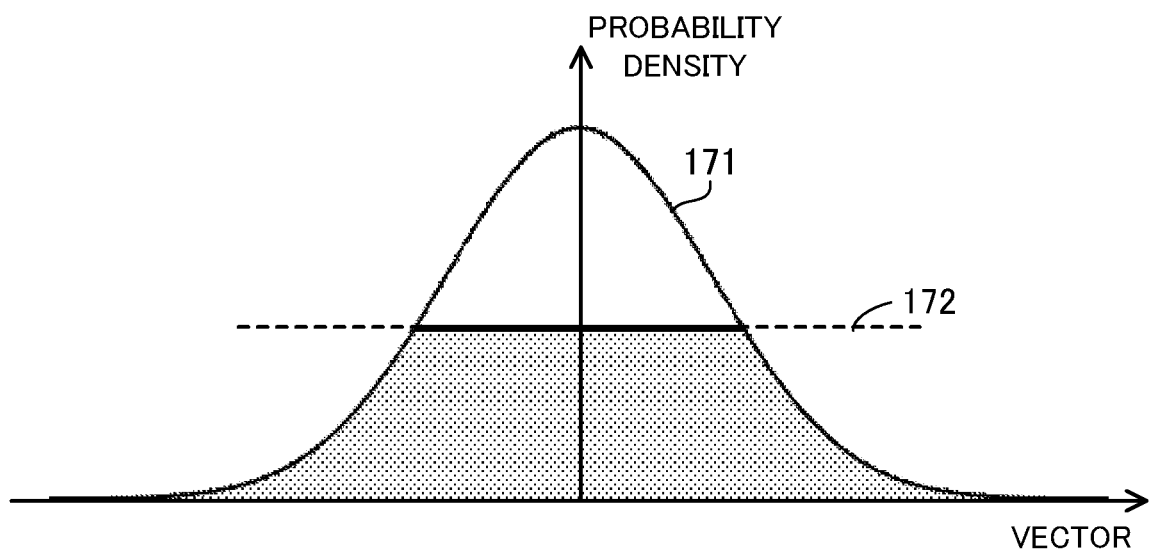
FIG. 9 illustrates an example of clipping in a probability distribution.

FIG. 9 illustrates an example of clipping in a probability distribution.

The probability densities of vectors are given by a probability distribution 171 that uses vectors as a probability variable. In general, a vector closer to the mean has a higher probability density, whereas a vector farther away from the means has a lower probability density. An image corresponding to a vector very far from the mean is highly likely to be an image completely different from an input the classification model 141 assumes. For example, in the case where the classification model 141 performs facial recognition, an image corresponding to a vector very far from the mean probably does not illustrate a human face. In the case where the classification model 141 performs character recognition, an image corresponding to a vector very far from the mean probably does not illustrate a handwritten character.

Therefore, using a probability density as a regularization term, a confidence score is multiplied by the regularization term, so that the search progresses preferentially in a direction getting closer to the mean of the probability distribution 171. This prevents finding an image that is completely different from an input the classification model 141 assumes.

On the other hand, an image corresponding to a vector too close to the mean may be an "averaged image" obtained by averaging the features of various classes. The averaged image is different from a sample image corresponding to a specified class, and this does not meet the purpose of the model inversion attack. By contrast, if a probability density itself is used as a regularization term, the search progresses preferentially in a direction getting closer to the mean even after the vector gets somewhat close to the mean, which allows the vector to get too close to the mean.

To deal with this, it is considered to set an upper limit value 172 for the probability distribution 171 and clip the regularization term using the upper limit value 172. In the case where a probability density is less than or equal to the upper limit value 172, the original probability density is used as the regularization term, and in the case where a probability density is greater than the upper limit value 172, the upper limit value 172 is used as the regularization term. That is, the regularization term is adjusted to be less than or equal to the upper limit value 172. This prevents a vector from getting too close to the mean of the probability distribution 171. The upper limit value 172 may be specified by the user, or may be automatically determined by the information processing apparatus 100 from the probability distribution 171, which is like setting a probability density based on 3σ (three times the standard deviation) as the upper limit value 172.

The following describes the functions of the information processing apparatus 100.

Figure 10:
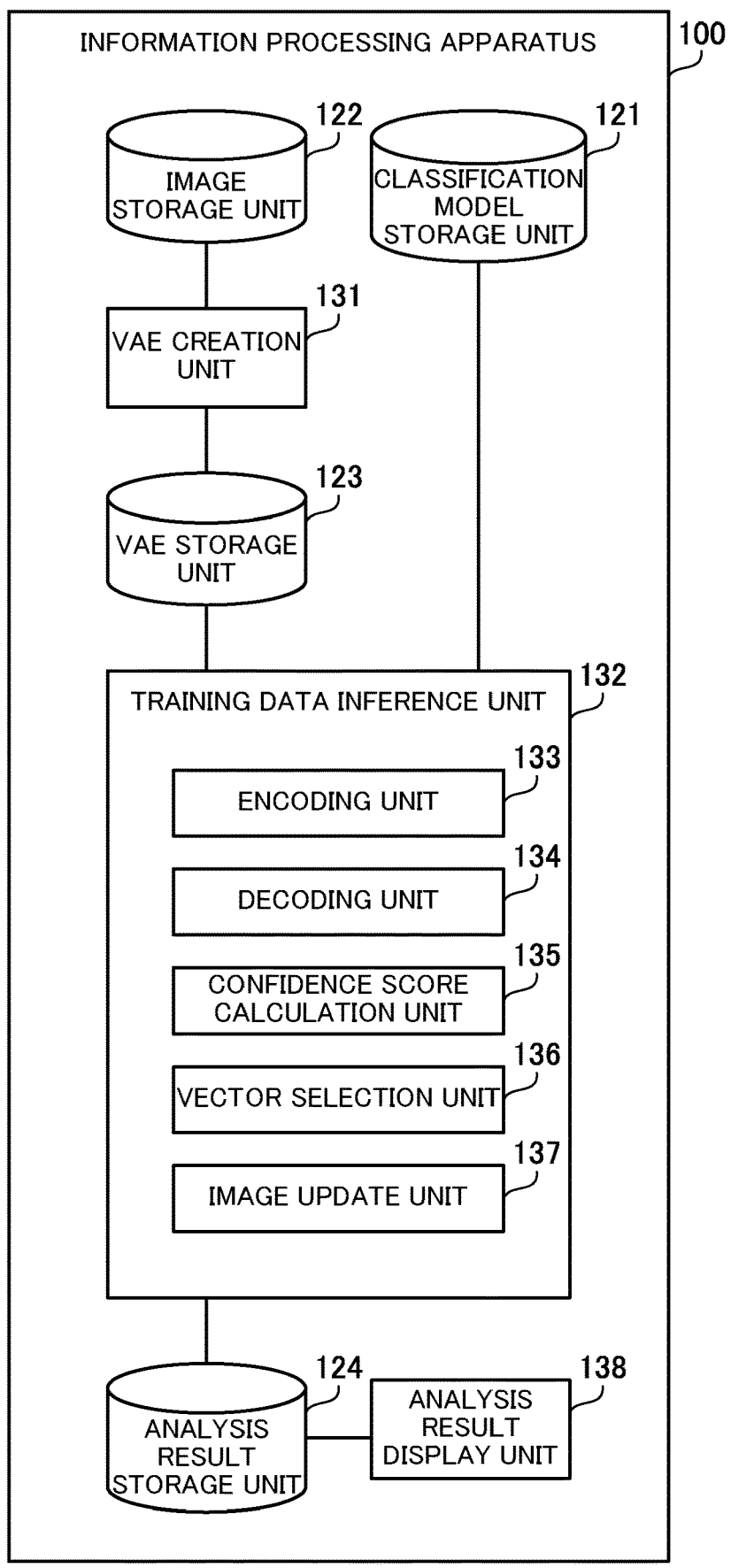
FIG. 10 is a block diagram illustrating an example of functions of the information processing apparatus.

FIG. 10 is a block diagram illustrating an example of functions of the information processing apparatus.

The information processing apparatus 100 includes a classification model storage unit 121, an image storage unit 122, a VAE storage unit 123, and an analysis result storage unit 124. These storage units are implemented by using a storage space of the RAM 102 or HDD 103, for example. In addition, the information processing apparatus 100 includes a VAE creation unit 131, a training data inference unit 132, and an analysis result display unit 138. These processing units are implemented by programs that the CPU 101 executes, for example.

The classification model storage unit 121 holds the learned classification model 141. The classification model 141 may be created by the information processing apparatus 100 or by another information processing apparatus. However, to test a model inversion attack, the information processing apparatus 100 only needs to be able to access the classification model 141, and does not need to hold the classification model 141 itself. For example, the information processing apparatus 100 may send images to another information processing apparatus that releases the functions of the classification model 141 and receive confidence scores from the other information processing apparatus.

The image storage unit 122 holds a set of images that are of the same type as inputs to the classification model 141. The images held in the image storage unit 122 are collected over the Internet, for example. For example, in the case where the classification model 141 is a facial recognition model, face photos are collected. In the case where the classification model 141 is a character recognition model, handwritten characters are collected.

The VAE storage unit 123 holds the learned variational autoencoder 151. The variational autoencoder 151 includes the learned encoder 152 and decoder 153. The variational autoencoder 151 is created by the information processing apparatus 100. However, in the case where the variational autoencoder 151 corresponding to the type of inputs to the classification model 141 already exists, the information processing apparatus 100 may obtain the learned variational autoencoder 151. In addition, the VAE storage unit 123 holds information indicating a probability distribution of vectors calculated between the encoder 152 and the decoder 153. In addition, the VAE storage unit 123 holds information indicating an upper limit value for a probability density, set in the probability distribution of the vectors.

The analysis result storage unit 124 holds an analysis result indicating the model inversion attack resistance of the classification model 141. The analysis result includes one or more inferred images as a result of inferring a sample image used in the machine learning of the classification model 141.

The VAE creation unit 131 creates the variational autoencoder 151 with machine leaning using the images stored in the image storage unit 122 as the inputs and outputs of the variational autoencoder 151. In the machine learning, the weights of the edges between nodes included in the variational autoencoder 151 are determined. The VAE creation unit 131 stores the variational autoencoder 151 including the encoder 152 and decoder 153 in the VAE storage unit 123. In addition, the VAE creation unit 131 inputs the images stored in the image storage unit 122 to the learned encoder 152 to calculate a set of vectors corresponding to the set of images. The VAE creation unit 131 specifies a probability distribution that the set of calculated vectors has and stores information indicating the probability distribution in the VAE storage unit 123. The probability distribution is specified by a mean vector and a variance-covariance matrix, for example.

The training data inference unit 132 tests a model inversion attack on the classification model 141 stored in the classification model storage unit 121. The training data inference unit 132 infers a sample image used in the machine learning of the classification model 141 and stores the analysis result including the inferred image in the analysis result storage unit 124. At this time, the training data inference unit 132 executes any of the above-described four training data inference methods. The training data inference unit 132 includes an encoding unit 133, a decoding unit 134, a confidence score calculation unit 135, a vector selection unit 136, and an image update unit 137.

The encoding unit 133 inputs images to the encoder 152 stored in the VAE storage unit 123 to calculate vectors corresponding to the input images. The encoding unit 133 is used in the second training data inference method. The decoding unit 134 inputs vectors to the decoder 153 stored in the VAE storage unit 123 to generate images corresponding to the input vectors. The confidence score calculation unit 135 inputs images to the classification model 141 to calculate confidence scores corresponding to the input images. The classification model 141 outputs a plurality of confidence scores corresponding to a plurality of classes. In the model inversion attack, however, one confidence score corresponding to one class focused on is used. The class to be focused on is specified by the user.

The vector selection unit 136 sets an upper limit value for a probability distribution and stores information indicating the upper limit value in the VAE storage unit 123. In addition, the vector selection unit 136 extracts the initial values of vectors from the latent space 154 on the basis of the information on the probability distribution stored in the VAE storage unit 123. In the third training data inference method and fourth training data inference method, the vector selection unit 136 calculates, for each vector, a gradient using a confidence score calculated by the confidence score calculation unit 135 and updates the vector on the basis of the gradient. In the second training data inference method and fourth training data inference method, the vector selection unit 136 calculates the evaluation values of the vectors, deletes vectors on the basis of the evaluation values, and adds vectors.

The image update unit 137 calculates, for each image, a gradient using a confidence score calculated by the confidence score calculation unit 135 and updates the image on the basis of the gradient. In the image update, the noise filter 164 and sharpening filter 165 prepared in advance are used. The image update unit 137 is used in the first training data inference method and second training data inference method.

The analysis result display unit 138 displays an analysis result stored in the analysis result storage unit 124 on the display device 111. For example, the analysis result display unit 138 displays an inferred image on the display device 111. In this connection, the information processing apparatus 100 may output the analysis result to another output device or may send the analysis result to another information processing result.

Figure 11:
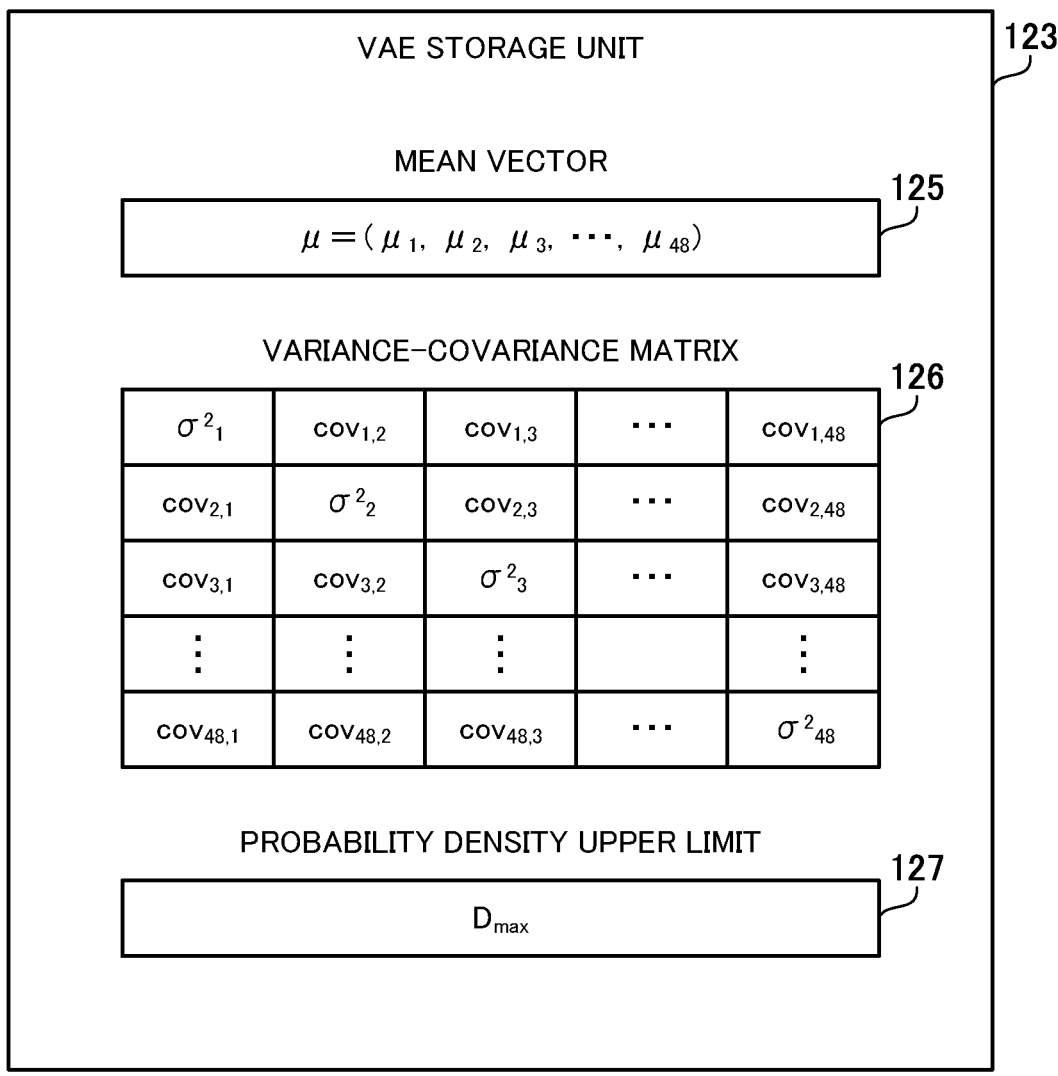
FIG. 11 illustrates an example of information on the probability distribution.

FIG. 11 illustrates an example of information on a probability distribution.

The VAE storage unit 123 holds a mean vector 125, a variance-covariance matrix 126, and a probability density upper limit 127 as information on a probability distribution of the latent space 154.

The mean vector 125 represents the mean of a multivariate normal distribution. The mean vector 125 is the mean of various vectors calculated by inputting various images to the encoder 152. The variance-covariance matrix 126 represents the variance of the multivariate normal distribution. The variance-covariance matrix 126 is a square matrix whose length on each side is the number of dimensions of a vector. The diagonal components in the variance-covariance matrix 126 represent the variance of each dimension calculated from the above various vectors. The off-diagonal components in the variance-covariance matrix 126 represent the covariance between two different dimensions calculated from the above various vectors. In this connection, it is assumed that the vectors calculated by inputting images used in creating the variational autoencoder 151 to the encoder 152 follow the multivariate normal distribution.

The probability density upper limit 127 is an upper limit value that is lower than the maximum probability density value of the multivariate normal distribution specified by the mean vector 125 and variance-covariance matrix 126. The probability density upper limit 127 may be specified by the user or may be automatically determined from the specified multivariate normal distribution. For example, a probability density corresponding to a vector away from the mean by $3\sigma$ (three times the standard deviation) is employed as the probability density upper limit 127.

FIG. 12 illustrates an example of a vector table.

The vector table 128 is held by the vector selection unit 136. The vector table 128 associates a vector, a confidence score, a probability density, and an evaluation value with each other. The vector registered in the vector table 128 is a vector included in the latest vector set 161 or vector set 166. The confidence score is the confidence score of a specified class calculated by the classification model 141. The probability density is given by a probability distribution that is specified by the mean vector 125 and variance-covariance matrix 126 in the latent space 154. The evaluation value is the product of a confidence score and a regularization term. The regularization term is obtained by clipping a probability density to the probability density upper limit 127. In the case where the probability density is less than or equal to the probability density upper limit 127, the probability density is taken as the regularization term. In the case where the probability density is greater than the probability density upper limit 127, the probability density upper limit 127 is taken as the regularization term.

The following describes how to infer training data. First, the above-described fourth training data inference method will be described. The third training data inference method is the same as the fourth training data inference method but without the outer loop, and therefore the description thereof is omitted. After that, the above-described second training data inference method will be described. The first training data inference method is the same as the second training data inference method but without the outer loop, and therefore the description thereof is omitted.

Figure 13:
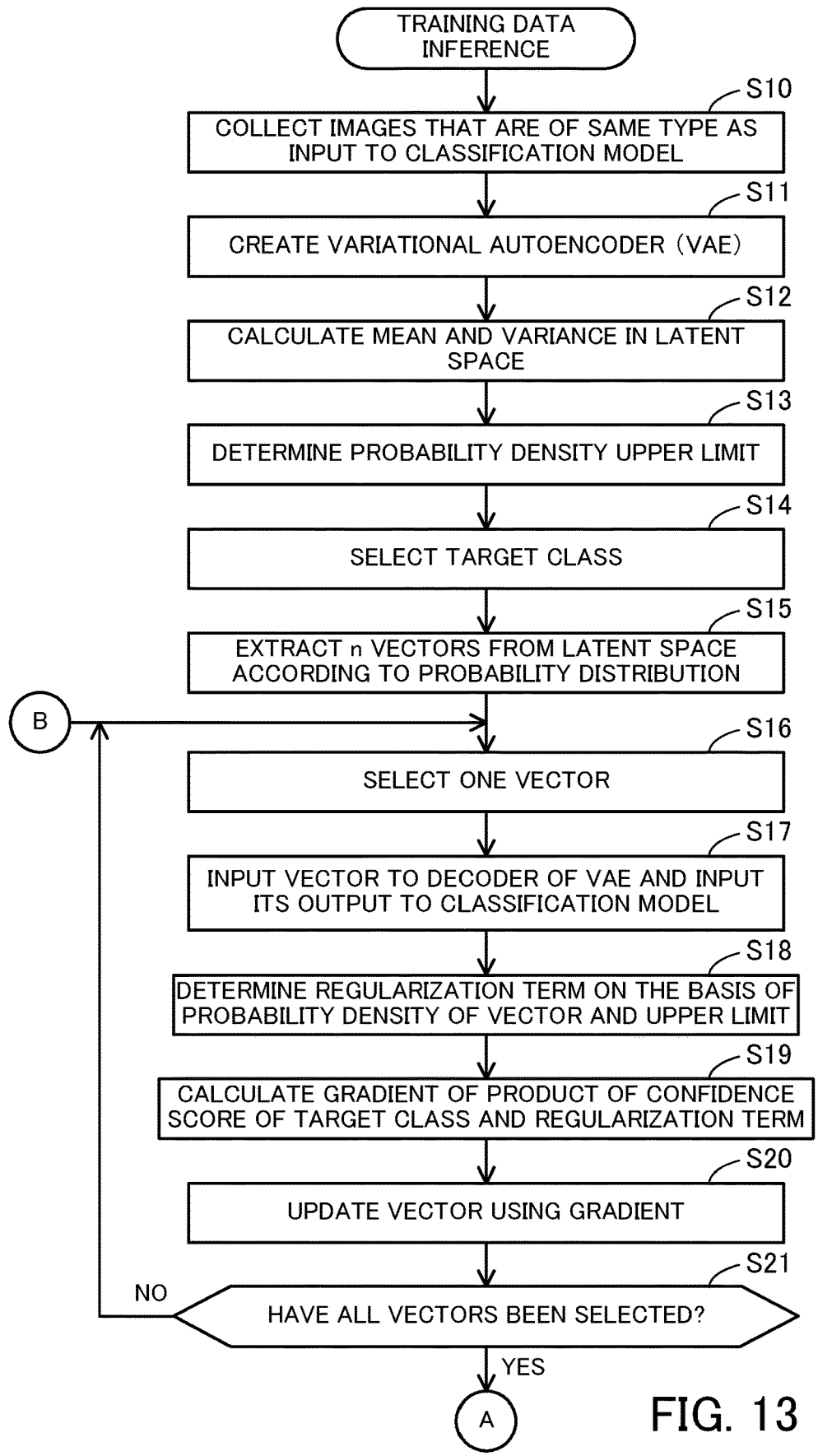
FIG. 13 is a flowchart illustrating a first example procedure for training data inference.

FIG. 13 is a flowchart illustrating a first example procedure for training data inference.

(S10) The VAE creation unit 131 collects images that are of the same type as input to the classification model 141. The types of images include face photos, handwritten characters, and others. The VAE creation unit 131 uses a crawler program that searches and collects images on the Internet, for example.

(S11) The VAE creation unit 131 creates the variational autoencoder 151 with machine learning using the images collected at step S10. The machine learning is unsupervised learning that uses each collected image as an input and an output of the variational autoencoder 151. The variational autoencoder 151 includes the encoder 152 and the decoder 153.

(S12) The VAE creation unit 131 inputs the images collected at step S10 to the encoder 152 created at step S11 to calculate a set of vectors. The vectors have 48 dimensions, for example. The VAE creation unit 131 carries out statistical processing on the set of vectors to calculate the mean vector 125 and variance-covariance matrix 126 that specify a probability distribution in the latent space 154. As the probability distribution of vectors, for example a multivariate normal distribution is assumed.

(S13) The vector selection unit 136 determines the probability density upper limit 127. The probability density upper limit 127 is a value that is lower than the maximum probability density value of the probability distribution specified at step S12. For example, the vector selection unit 136 calculates a probability density at a position away from the mean vector 125 by a predetermined multiple of the standard deviation and employs the probability density as the probability density upper limit 127.

(S14) The vector selection unit 136 selects a target class that is targeted for the model inversion attack from a plurality of classes for which the classification model 141 outputs confidence scores. The target class is specified by the user of the information processing apparatus 100, for example.

(S15) The vector selection unit 136 randomly extracts n vectors from the latent space 154 according to the probability distribution specified by the mean vector 125 and variance-covariance matrix 126 calculated at step S12. For example, assume that n=16.

(S16) The decoding unit 134 selects one vector from the n vectors.

(S17) The decoding unit 134 inputs the vector selected at step S16 to the decoder 153 created at step S11 to transform it to an image. The confidence score calculation unit 135 inputs the transformed image to the classification model 141 to calculate the confidence scores of the plurality of classes.

(S18) The vector selection unit 136 calculates the probability density of the vector selected at step S16 on the basis of the probability distribution of step S12. The vector selection unit 136 compares the calculated probability density with the probability density upper limit 127 determined at step S13 to determine a regularization term corresponding to the vector. The regularization term is the probability density if the probability density is less than or equal to the probability density upper limit 127, and is the probability density upper limit 127 if the probability density is greater than the probability density upper limit 127.

(S19) The vector selection unit 136 extracts the confidence score of the target class selected at step S14 from the confidence scores of the plurality of classes calculated at step S17. The vector selection unit 136 calculates the product of the extracted confidence score and the regularization term determined at step S18, and calculates the gradient of the product of the confidence score and regularization term on the basis of the vector. For example, the gradient is calculated by changing the element of each dimension of the vector by a small amount.

(S20) The vector selection unit 136 updates the vector selected at step S16 using the gradient calculated at step S19. For example, the vector selection unit 136 changes the vector by an amount obtained by multiplying the gradient by a predetermined learning rate.

(S21) The decoding unit 134 determines whether all the n vectors have been selected at step S16. If all the vectors have been selected, the process proceeds to step S22. If any of the vectors has not been selected, then the process proceeds back to step S16.

Figure 14:
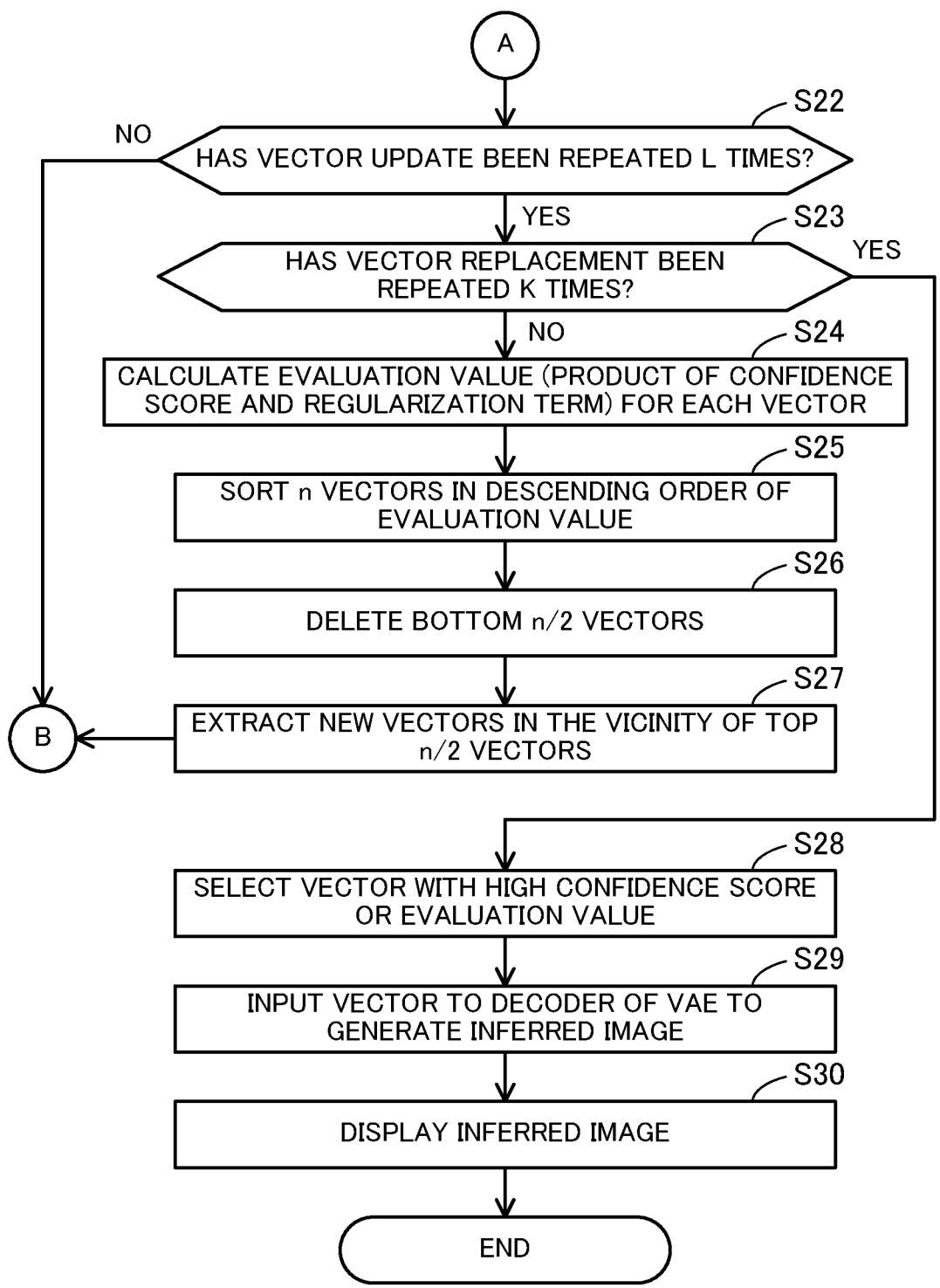
FIG. 14 is a flowchart (continued) illustrating the first example procedure for training data inference.

FIG. 14 is a flowchart (continued) illustrating the first example procedure for training data inference.

(S22) The vector selection unit 136 determines whether the vector update of steps S16 to S21, that is, the inner loop has been repeated L times. For example, assume that L=4. If the number of successive iterations of the vector update reaches L, the process proceeds to step S23. If the number of successive iterations is less than L, the process proceeds back to step S16. At step S16, n vectors are selected one by one again.

(S23) The vector selection unit 136 determines whether the vector replacement of the following steps S24 to S27, that is, the outer loop has been repeated K times. For example, K is in the range of 3 to 6. If the number of iterations of the vector replacement reaches K, the process proceeds to step S28. If the number of iterations is less than K, the process proceeds to step S24.

(S24) The vector selection unit 136 calculates an evaluation value for each of the latest n vectors. The evaluation value is the product of a confidence score and a regularization term. The product of a confidence score and a regularization term is calculated in the same manner as the above-described steps S17 to S19.

(S25) The vector selection unit 136 sorts the latest n vectors in descending order of evaluation value on the basis of the evaluation values calculated at step S24.

(S26) The vector selection unit 136 deletes half (bottom n/2 vectors) of the latest n vectors with low evaluation values.

(S27) The vector selection unit 136 extracts n/2 new vectors in the vicinity of half (top n/2 vectors) of the vectors with high evaluation values from the latent space 154. For example, the vector selection unit 136 defines narrow-range probability distributions (with small standard deviation) each having one of the top n/2 vectors as a center. The vector selection unit 136 randomly extracts new vectors according to the probability distributions. By adding the top n/2 vectors and the additional n/2 vectors together, n vectors are prepared. Then, the process proceeds to step S16.

(S28) The vector selection unit 136 selects a vector with a high confidence score or a high evaluation value. Whether to use the confidence score or the evaluation value as a reference value is set in advance. For example, the vector selection unit 136 selects a vector with the maximum confidence score or the maximum evaluation value.

(S29) The decoding unit 134 inputs the vector selected at step S28 to the decoder 153 to transform the selected vector into an image, which is taken as an inferred image. The inferred image is inferred as a sample image corresponding to the specified class.

(S30) The analysis result display unit 138 displays the inferred image on the display device 111.

In this connection, in the case of the third training data inference method, steps S23 to S27 are omitted. If an affirmative result is obtained at step S22, the process proceeds to step S28.

Figure 15:
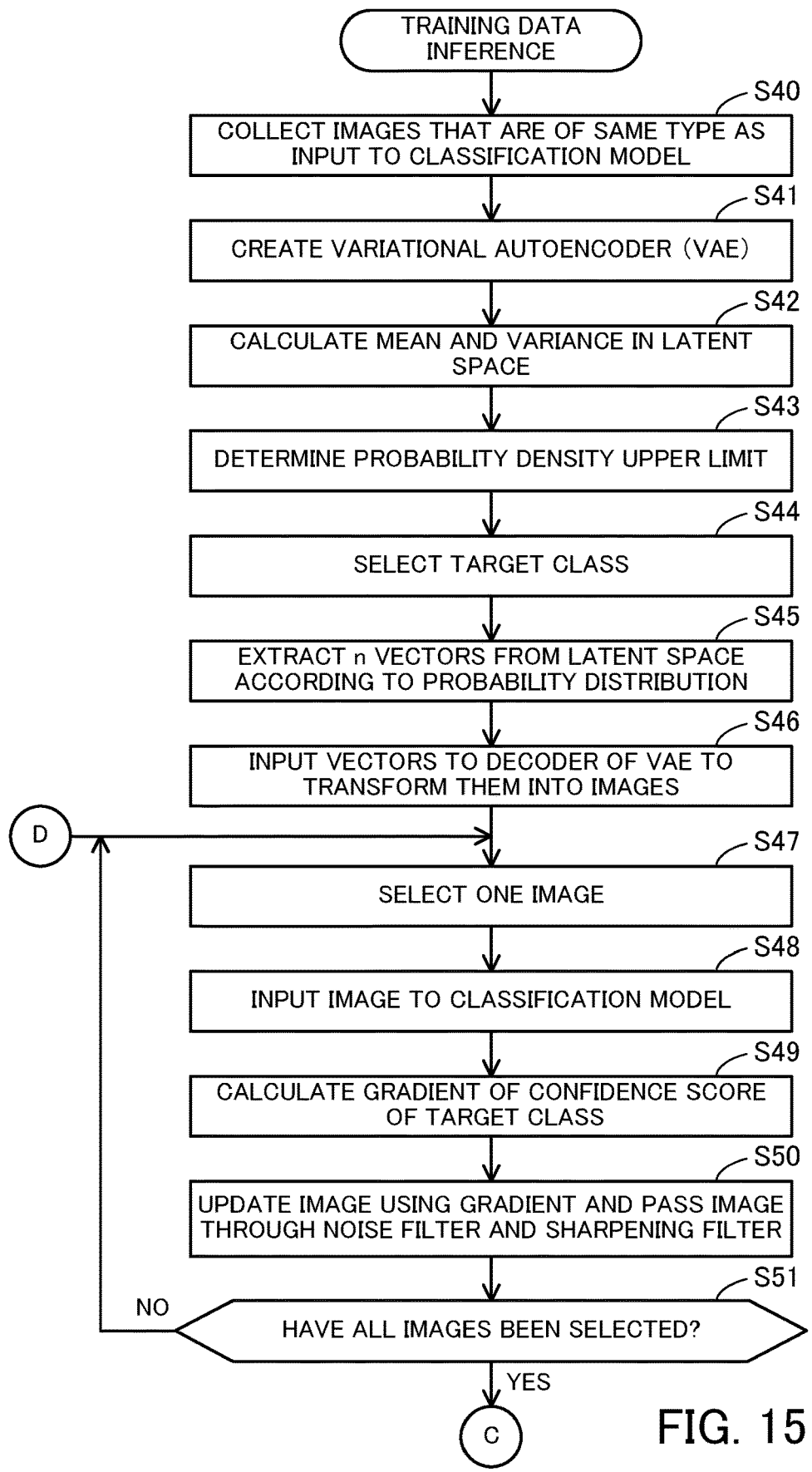
FIG. 15 is a flowchart illustrating a second example procedure for training data inference.

FIG. 15 is a flowchart illustrating a second example procedure for training data inference.

(S40) The VAE creation unit 131 collects images that are of the same type as input to the classification model 141.

(S41) The VAE creation unit 131 creates the variational autoencoder 151 with machine learning using the images collected at step S40. The variational autoencoder 151 includes the encoder 152 and the decoder 153.

(S42) The VAE creation unit 131 inputs the images collected at step S40 to the encoder 152 created at step S41 to calculate a set of vectors. The VAE creation unit 131 carries out statistical processing on the set of vectors to calculate the mean vector 125 and variance-covariance matrix 126 that specify a probability distribution in the latent space 154.

(S43) The vector selection unit 136 determines the probability density upper limit 127.

(S44) The vector selection unit 136 selects a target class that is targeted for the model inversion attack from a plurality of classes for which the classification model 141 outputs confidence scores.

(S45) The vector selection unit 136 randomly extracts n vectors from the latent space 154 according to the probability distribution specified by the mean vector 125 and variance-covariance matrix 126 calculated at step S42. For example, assume that n=16.

(S46) The decoding unit 134 inputs each of the n vectors extracted at step S45 to the decoder 153 created at step S41 to transform them to n images.

(S47) The confidence score calculation unit 135 selects one image from the n images.

(S48) The confidence score calculation unit 135 inputs the image selected at step S47 to the classification model 141 to calculate the confidence scores of the plurality of classes.

(S49) The image update unit 137 extracts the confidence score of the target class selected at step S44 from the confidence scores of the plurality of classes calculated at step S48. The image update unit 137 then calculates the gradient of confidence score on the basis of the image. For example, the gradient is calculated by changing each pixel value of the image selected at step S47 by a small amount.

(S50) The image update unit 137 updates the image selected at step S47 using the gradient calculated at step S49. For example, the image update unit 137 changes the pixel values by an amount obtained by multiplying the gradient by a predetermined learning rate. The image update unit 137 inputs the updated image to the noise filter 164 to eliminate noise and further inputs the resultant to the sharpening filter 165 to sharpen the image.

(S51) The confidence score calculation unit 135 determines whether all the n images have been selected at step S47. If all the images have been selected, the process proceeds to step S52. If any of the images has not been selected, the process proceeds back to step S47.

Figure 16:
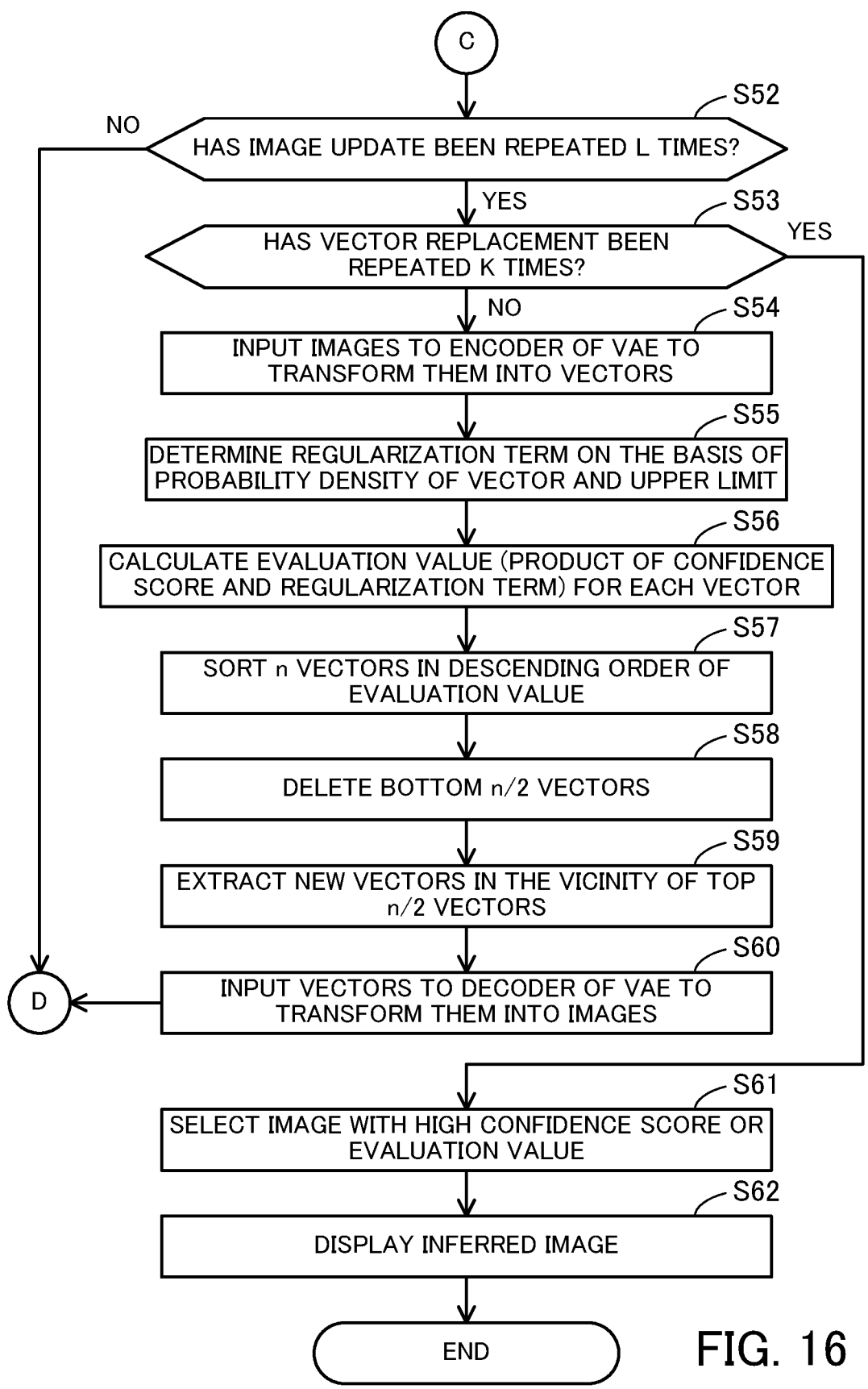
FIG. 16 is a flowchart (continued) illustrating the second example procedure for training data inference.

FIG. 16 is a flowchart (continued) illustrating the second example procedure for training data inference.

(S52) The vector selection unit 136 determines whether the image update of steps S47 to S51, that is, the inner loop has been repeated L times. If the number of successive iterations of the image update reaches L, the process proceeds to step S53. If the number of successive iterations is less than L, the process proceeds to step S47. At step S47, n images are selected one by one again.

(S53) The vector selection unit 136 determines whether the vector replacement of the following steps S54 to S60, that is, the outer loop has been repeated K times. If the number of iterations of the vector replacement reaches K, the process proceeds to step S61. If the number of iterations is less than K, the process proceeds to step S54.

(S54) The encoding unit 133 inputs each of the latest n images to the encoder 152 created at step S41 to transform them to n vectors.

(S55) The vector selection unit 136 calculates the probability density of each of the n vectors obtained at step S54, on the basis of the probability distribution of step S42. The vector selection unit 136 compares the calculated probability density with the probability density upper limit 127 determined at step S43 to determine a regularization term corresponding to each of the n vectors. The regularization term is the probability density if the probability density is less than or equal to the probability density upper limit 127, and is the probability density upper limit 127 if the probability density is greater than the probability density upper limit 127.

(S56) The vector selection unit 136 calculates an evaluation value for each of the n vectors. The evaluation value is the product of the confidence score and the regularization term obtained at step S55.

(S57) The vector selection unit 136 sorts the n vectors in descending order of evaluation value on the basis of the evaluation values calculated at step S56.

(S58) The vector selection unit 136 deletes half (bottom n/2 vectors) of the n vectors with low evaluation values.

(S59) The vector selection unit 136 extracts n/2 new vectors in the vicinity of half (top n/2 vectors) of the vectors with high evaluation values from the latent space 154. By adding the top n/2 vectors and the additional n/2 vectors together, n vectors are obtained.

(S60) The decoding unit 134 inputs each of the n vectors obtained at step S59 to the decoder 153 to transform them to n images. Then, the process proceeds to step S47.

(S61) The image update unit 137 selects an image with a high confidence score or a high evaluation value as an inferred image. Whether to use the confidence score or the evaluation value as a reference value is set in advance. For example, the image update unit 137 selects an image with the maximum confidence score or the maximum evaluation value.

(S62) The analysis result display unit 138 displays the inferred image on the display device 111.

In this connection, in the first training data inference method, steps S53 to S60 are omitted. If an affirmative result is obtained at step S52, the process proceeds to step S61.

The information processing apparatus 100 of the second embodiment tests a model inversion attack on the learned classification model 141, and confirms how much reproducibility is evinced in inferring sample images used in the machine learning of the classification model 141. Therefore, for the case where the training data includes confidential information such as personal information, it is achieved to evaluate the attack resistance of the classification model 141 before the classification model 141 is released. This makes it possible to reduce the risk of unintended information leakage and to improve security for the classification model 141.

In addition, the variational autoencoder 151 is created from images that are of the same type as input to the classification model 141, and initial images to be input to the classification model 141 are generated using the decoder 153 included in the variational autoencoder 151. Vectors to be input to the decoder 153 have a specific probability distribution such as a normal distribution. Therefore, by selecting vectors according to the probability distribution, it is achieved to generate natural initial images as inputs to the classification model 141. Therefore, it is achieved to reduce the number of accesses made to the classification model 141 until the search converges and to increase the possibility of finally reaching an image close to a sample image.

According to one aspect, a search space is changed from an image space to a vector space, and the gradient of confidence score for a vector is calculated and the vector is updated, instead of calculating the gradient of confidence score for an image and directly updating the image. The vector space has fewer dimensions than the image space. Therefore, the number of accesses to the classification model 141 is reduced. Further, according to one aspect, vectors with low evaluation values are eliminated from candidates in the midway and vectors in the vicinity of vectors with high evaluation values are added as candidates. This eliminates wasteful search with a low possibility of reaching a sample image and reduces the number of accesses to the classification model 141.

Still further, according to one aspect, an index value obtained by multiplying a confidence score by the probability density of a vector is used, instead of the confidence score itself. This reduces the occurrence that search for increasing a confidence score converges to a local solution and an unnatural image is obtained as an input to the classification model 141. Still further, according to one aspect, an upper limit value is set for a probability density and the confidence score is multiplied by a value obtained by clipping a probability density to the upper limit value. This reduces the occurrence that the search gets too close to an averaged image and increases the possibility of reaching an image close to a sample image corresponding to a specified class. As a result, it is achieved to efficiently test the model inversion attack on the classification model 141 within a realistic time frame and to improve the accuracy of evaluating the attack resistance of the classification model 141.

According to one aspect, the accuracy of evaluating the attack resistance of a learned model is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control method comprising:
obtaining, by a processor, a classification model and a transformation model, the classification model being configured to calculate, from input image data, a confidence score indicating a likelihood that the input image data belongs to a specified class, the transformation model being a model for transforming an input feature value having fewer dimensions than the input image data into the input image data and being created such that a set of feature values corresponding to a set of image data is included in a feature space having a specific probability distribution;
extracting, by the processor, a first feature value from the feature space;
transforming, by the processor, the first feature value into first image data using the transformation model, and calculating a first confidence score corresponding to the first image data using the classification model; and
calculating, by the processor, a weight coefficient using a first probability density corresponding to the first feature value, and searching for a second feature value from the feature space based on a product of the first confidence score and the weight coefficient in such a manner that a second confidence score to be calculated by the classification model from second image data corresponding to the second feature value is higher than the first confidence score, the first probability density being given by the specific probability distribution.

2. The control method according to claim 1, further comprising creating, by the processor, a variational autoencoder including an encoder and a decoder, and using the decoder as the transformation model, the encoder being configured to transform the input image data into the input feature value, the decoder being configured to transform the input feature value into the input image data.

3. The control method according to claim 1, further comprising:
setting, by the processor, an upper limit value that is lower than a maximum probability density value of the specific probability distribution,
wherein the searching further includes using the first probability density as the weight coefficient in response to the first probability density being less than or equal to the upper limit value, and using the upper limit value as the weight coefficient in response to the first probability density being greater than the upper limit value.

4. The control method according to claim 1, wherein:
the extracting includes extracting a plurality of first feature values including the first feature value;
the searching includes updating the plurality of first feature values to a plurality of second feature values including the second feature value; and
the control method further includes
calculating, by the processor, an evaluation value of each of the plurality of second feature values, based on a second confidence score calculated from the each of the plurality of second feature values, and
selecting, by the processor, at least one second feature value from the plurality of second feature values, based on the evaluation value of the each of the plurality of second feature values, extracting an additional second feature value existing within a predetermined range from the at least one second feature value, and adding the additional second feature value as the feature value to be input to the transformation model.

5. An information processing apparatus comprising:
a memory configured to hold a classification model and a transformation model, the classification model being configured to calculate, from input image data, a confidence score indicating a likelihood that the input image data belongs to a specified class, the transformation model being a model for transforming an input feature value having fewer dimensions than the input image data into the input image data and being created such that a set of feature values corresponding to a set of image data is included in a feature space having a specific probability distribution; and
a processor configured to
extract a first feature value from the feature space,
transform the first feature value into first image data using the transformation model, and calculate a first confidence score corresponding to the first image data using the classification model, and
calculate a weight coefficient using a first probability density corresponding to the first feature value, and search for a second feature value from the feature space based on a product of the first confidence score and the weight coefficient in such a manner that a second confidence score to be calculated by the classification model from second image data corresponding to the second feature value is higher than the first confidence score, the first probability density being given by the specific probability distribution.

6. A control method comprising:
extracting, by a processor, a first value from a feature space, the feature space including a plurality of values based on features of a plurality of image datasets and having a specific distribution, the plurality of values each having fewer variables than each of the plurality of image datasets;
obtaining, by the processor, a first confidence score of a specified group among confidence scores of groups included in a classification inference result obtained by a classification inference model receiving the first value as an input value; and
calculating, by the processor, a weight coefficient using a first probability density corresponding to the first value, and searching for a second value from the feature space based on a product of the first confidence score and the weight coefficient such that a second confidence score of the specified group to be included in a classification inference result obtained by the classification inference model receiving the second value as an input value is higher than the first confidence score, the first probability density being given by the specific distribution.

* * * * *